US009586613B2

(12) United States Patent
Shinbori et al.

(10) Patent No.: US 9,586,613 B2
(45) Date of Patent: Mar. 7, 2017

(54) VEHICLE

(71) Applicant: YAMAHA HATSUDOKI KABUSHIKI KAISHA, Iwata-shi, Shizuoka (JP)

(72) Inventors: Masahide Shinbori, Shizuoka (JP); Kenichi Maeda, Newnan, GA (US)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 10 days.

(21) Appl. No.: 14/178,976

(22) Filed: Feb. 12, 2014

(65) Prior Publication Data

US 2014/0224561 A1  Aug. 14, 2014

Related U.S. Application Data

(60) Provisional application No. 61/764,693, filed on Feb. 14, 2013.

(51) Int. Cl.
*B60G 3/20* (2006.01)
*B62D 3/12* (2006.01)
*B60G 7/00* (2006.01)
*B62D 7/12* (2006.01)
*B62D 23/00* (2006.01)

(52) U.S. Cl.
CPC ............... *B62D 3/12* (2013.01); *B60G 3/20* (2013.01); *B60G 7/001* (2013.01); *B62D 7/12* (2013.01); *B60G 2200/144* (2013.01); *B60G 2206/12* (2013.01); *B60G 2206/124* (2013.01); *B60G 2300/124* (2013.01); *B60G 2300/13* (2013.01); *B62D 23/005* (2013.01)

(58) Field of Classification Search
CPC . B60G 3/18; B60G 11/26; B62D 7/06; B62D 7/18
USPC ............ 180/253, 254, 256, 376; 280/93.512, 280/93.51, 93.514, 124, 135, 124.136
See application file for complete search history.

(56) References Cited

U.S. PATENT DOCUMENTS 4,613,009 A * 9/1986 Nakamura et al. ........... 180/253
4,659,106 A * 4/1987 Fujita et al. ............ 280/124.103
4,697,662 A * 10/1987 Zollmeyer et al. ........... 180/256
(Continued)

FOREIGN PATENT DOCUMENTS

JP        7-23285 Y2    5/1995

*Primary Examiner* — Anne Marie Boehler
(74) *Attorney, Agent, or Firm* — Keating and Bennett, LLP

(57) ABSTRACT

A vehicle includes a pair of front wheels, a frame portion, a drive source, a pair of suspension assemblies, a pair of drive shafts, a steering wheel, and a transfer mechanism which transfers movement of the steering wheel to the pair of front wheels. Each of the pair of suspension assemblies includes an upper arm supported pivotably by the frame portion, a lower arm supported pivotably by the frame portion below the upper arm, and a knuckle arm connecting the upper arm and the lower arm to each other. The transfer mechanism includes a steering shaft portion extending from the steering wheel and rotates with the steering wheel, a rack-and-pinion portion provided at a tip region of the steering shaft portion, and a pair of tie rods extending in a width direction of the vehicle and connecting the rack-and-pinion portion to the pair of knuckle arms. Each of the pair of drive shafts passes through between the upper arm and the lower arm, whereas each of the pair of tie rods passes above the upper arm.

6 Claims, 19 Drawing Sheets

(56) References Cited

U.S. PATENT DOCUMENTS

| | | | |
|---|---|---|---|
| 5,161,813 A * | 11/1992 | Yamashita | B60G 3/00 180/253 |
| 6,148,945 A * | 11/2000 | Alessandro et al. | 180/256 |
| 7,896,371 B2 | 3/2011 | Matsuura | |
| 2001/0028156 A1 * | 10/2001 | Handa | 280/93.512 |
| 2005/0017472 A1 * | 1/2005 | Kondo | B60G 7/008 280/93.513 |
| 2007/0170682 A1 * | 7/2007 | Kinugasa | 280/124.135 |
| 2013/0024070 A1 * | 1/2013 | Yu | B62D 3/12 701/37 |

* cited by examiner

F I G. 1
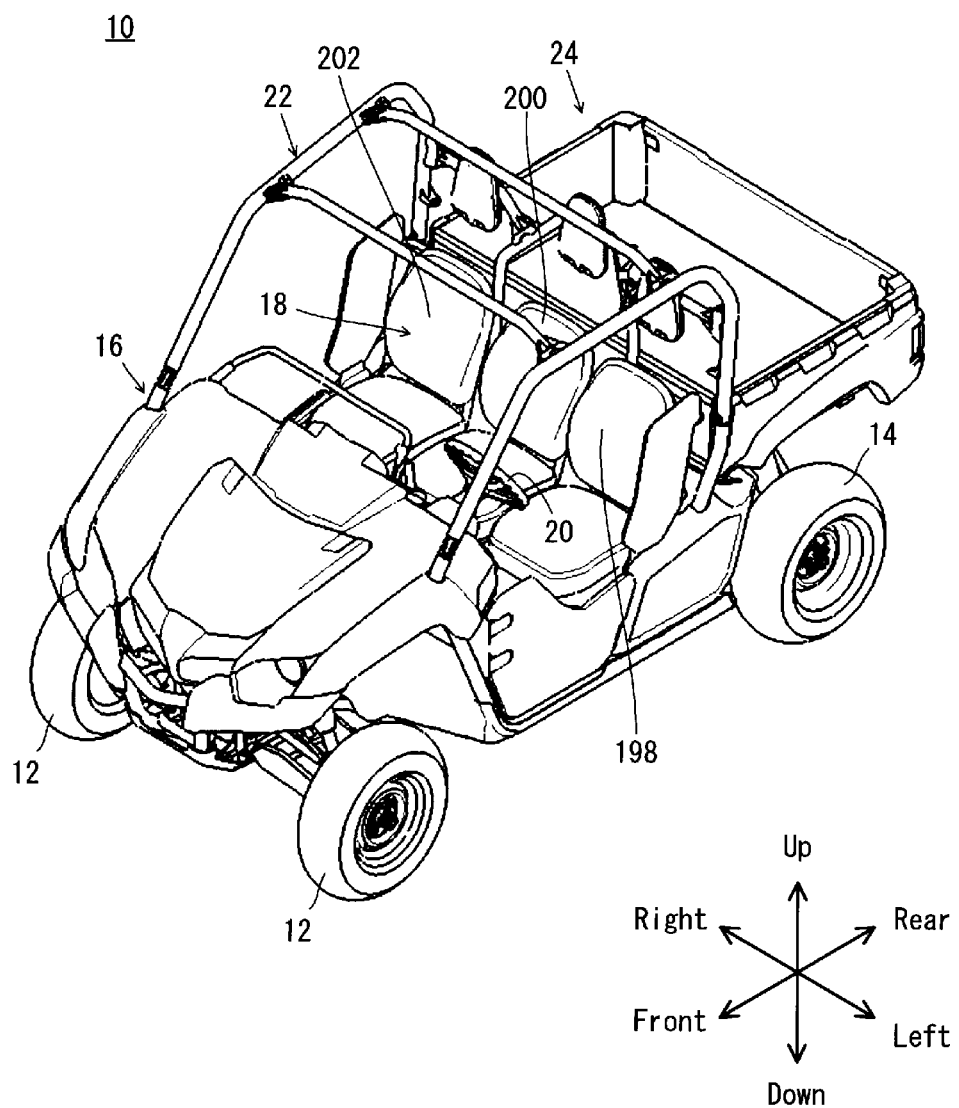

VEHICLE

BACKGROUND OF THE INVENTION

1. Field of the Invention

The present invention relates to vehicles, and more specifically to a vehicle including a pair of suspension assemblies suspending a pair of front wheels.

2. Description of the Related Art

Conventionally, there is proposed a variety of off-road vehicles (e.g., Recreational Off-Highway Vehicles (ROVs)).

For example, U.S. Pat. No. 7,896,371B2 discloses a vehicle which includes a pair of front wheels, a pair of rear wheels, a body frame, an engine and a steering wheel. The body frame is supported by the pair of front wheels and the pair of rear wheels. The engine is supported by the body frame, and drives the pair of rear wheels. The steering wheel is connected to the pair of front wheels via a steering shaft, a pitman arm and a pair of tie rods.

In order to suspend the pair of front wheels, double wishbone type suspensions are provided at a forward region of the body frame. The suspensions include a pair of upper arms, a pair of lower arms, and a pair of shock absorbers. The upper arms are connected to the respective lower arms by a pair of front wheel hub carriers. Each tie rod passes through between the upper arm and the lower arm and is connected to one of the hub carriers. Thus, the driver's operation on the steering wheel is transferred to the steering shaft, the pair of tie rods and then to the pair of hub carriers, and consequently the pair of front wheels are steered.

If the vehicle disclosed in U.S. Pat. No. 7,896,371B2 is to be configured as a front-wheel drive vehicle, it is necessary to have a drive shaft also passing through between the upper arm and the lower arm, in addition to the tie rod. In this case, there must be a sufficient space between the upper arm and the lower arm for the tie rod and the drive shaft.

Particularly, in cases where a steering mechanism of a rack-and-pinion type is utilized, due to the size of the rack-and-pinion portion, it is required that the tie rod be disposed at an upper location, so the upper arm must be disposed at an upper location. This makes it impossible to make the suspensions compact.

SUMMARY OF THE INVENTION

Therefore, preferred embodiments of the present invention provide a vehicle in which at least a pair of front wheels are used as drive wheels, a rack-and-pinion steering mechanism is utilized, and a pair of suspension assemblies for the front wheels are made compact.

According to a preferred embodiment of the present invention, a vehicle includes a pair of front wheels; a frame portion; a drive source; a pair of suspension assemblies provided at a forward region of the frame portion and suspending the pair of front wheels; a pair of drive shafts extending in a width direction of the vehicle and transferring driving force from the drive source to the pair of front wheels; a steering wheel; and a transfer mechanism transferring movement of the steering wheel to the pair of front wheels. In this vehicle, each of the pair of suspension assemblies includes an upper arm pivotably supported by the frame portion; a lower arm pivotably supported by the frame portion below the upper arm; and a knuckle arm connecting the upper arm and the lower arm to each other. Further, the transfer mechanism includes a steering shaft portion extending from the steering wheel and rotating with the steering wheel; a rack-and-pinion portion at a tip region of the steering shaft portion; and a pair of tie rods extending in the width direction of the vehicle and connecting the rack-and-pinion portion to the pair of knuckle arms. With these arrangements, each of the pair of drive shafts passes between a corresponding one of the upper arms and a corresponding one of the lower arms, and each of the pair of tie rods passes above a corresponding one of the upper arms.

According to a preferred embodiment of the present invention, the tie rod passes above the upper arm, and the drive shaft passes through between the upper arm and the lower arm. This makes it possible to decrease a distance between the upper arm and the lower arm in an up-down direction in comparison to a case where the tie rod and the drive shaft pass through between the upper arm and the lower arm. This makes it possible to make the pair of suspension assemblies compact.

Preferably, each upper arm includes a rear arm portion which has a first end portion supported by the frame portion pivotably in an up-down direction; a front arm portion which has a second end portion supported by the frame portion pivotably in an up-down direction and is at a more forward position than the rear arm portion; and a connecting portion connecting the rear arm portion and the front arm portion to each other on a side spaced away from the first end portion and the second end portion in the width direction of the vehicle. With the above arrangement, the connecting portion is connected to the knuckle arm, and each rear arm portion crosses a corresponding one of the tie rods in a plan view. Since the tie rod extends in the width direction (left-right direction) of the vehicle, the rear arm portion disposed across the tie rod extends from ahead of the tie rod to behind the tie rod in a plan view in a fore-aft direction of the vehicle. By arranging the rear arm portion in this way, it becomes possible to increase a fore-aft dimension of the rear arm portion. This makes it possible to increase a fore-aft dimension of the upper arm. As a result, the arrangement makes it possible to improve the strength and resistance of the upper arm to external forces in the fore-aft direction.

Further preferably, each of the pair of suspension assemblies further includes a ball joint connecting the connecting portion and the knuckle arm to each other. With this, each rear arm portion extends from the first end portion toward the connecting portion at a greater downward tilt than an imaginary straight line connecting a pivot center of the first end portion and a rotation center of the ball joint in a front view, and then is connected to the connecting portion. In this case, it is possible to sufficiently separate the tie rod and the rear arm portion from each other in an up-down direction. Thus, the arrangement makes it possible to prevent the tie rod and the rear arm portion from contacting each other when the upper arm pivots up and down.

Further, preferably, each upper arm includes a rear arm portion which has a first end portion supported by the frame portion pivotably in an up-down direction; a front arm portion which has a second end portion supported by the frame portion pivotably in an up-down direction and is at a more forward position than the rear arm portion; and a connecting portion connecting the rear arm portion and the front arm portion to each other on a side away from the first end portion and the second end portion in the width direction of the vehicle. With this arrangement, the connecting portion is connected to the knuckle arm, and each front arm portion crosses a corresponding one of the tie rods in a plan view. Since the tie rod extends in the width direction (left-right direction) of the vehicle, the front arm portion disposed across the tie rod extends from ahead of the tie rod to behind the tie rod in a plan view in a fore-aft direction of the vehicle.

By arranging the front arm portion in this way, it becomes possible to increase a fore-aft dimension of the front arm portion. This makes it possible to increase a fore-aft dimension of the upper arm. As a result, the arrangement makes it possible to improve the strength and resistance of the upper arm to external forces in the fore-aft direction.

Preferably, each of the pair of suspension assemblies further includes a ball joint connecting the connecting portion and the knuckle arm to each other. With this structure, each front arm portion extends from the second end portion toward the connecting portion at a greater downward tilt than an imaginary straight line connecting a pivot center of the second end portion and a rotation center of the ball joint in a front view, and then extends upward, toward the connecting portion. In this case, it is possible to sufficiently separate the tie rod and the front arm portion from each other in an up-down direction. Thus, the arrangement makes it possible to prevent the tie rod and the front arm portion from contacting each other when the upper arm pivots up and down.

Further preferably, each of the pair of suspension assemblies further includes a shock absorber connecting the upper arm and the frame portion to each other. In this case, the shock absorber is not supported by the lower arm but by the upper arm. The arrangement makes it possible to dispose the shock absorber at a higher position than the drive shaft. Contact between the drive shaft and the shock absorber is prevented by such a simple arrangement.

Further, preferably, each tie rod is at a more forward position than the steering wheel and passes behind the shock absorber. In this case, the tie rod is protected by the shock absorber. Also, the arrangement decreases the distance between the steering wheel and the tie rod in a fore-aft direction, and this makes it possible to make the transfer mechanism compact.

Preferably, each upper arm includes a rear arm portion which has a first end portion supported by the frame portion pivotably in an up-down direction; a front arm portion which has a second end portion supported by the frame portion pivotably in an up-down direction and is at a more forward position than the rear arm portion; and a connecting portion connecting the rear arm portion and the front arm portion to each other on a side spaced away from the first end portion and the second end portion in the width direction of the vehicle. With this structure, each tie rod includes an inner-side end portion which is closer to the rack-and-pinion portion, and an outer-side end portion which is closer to the knuckle arm; the connecting portion is connected to the knuckle arm; and the inner-side end portion and the outer-side end portion is passed by an imaginary first straight line, which passes above an imaginary second straight line connecting a pivot center of the first end portion and a pivot center of the second end portion. In this case, it is possible to sufficiently separate the tie rod and the upper arm from each other in an up-down direction. Thus, the arrangement makes it possible to prevent the tie rod and the upper arm portion from contacting each other when the upper arm pivots up and down. It also makes it possible to prevent contact between the tie rod and the upper arm without increasing the size of the knuckle arm as compared to cases where the first straight line passes below the second straight line.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a perspective view of a vehicle according to a preferred embodiment of the present invention.

DETAILED DESCRIPTION OF THE PREFERRED EMBODIMENTS

Figure 2:
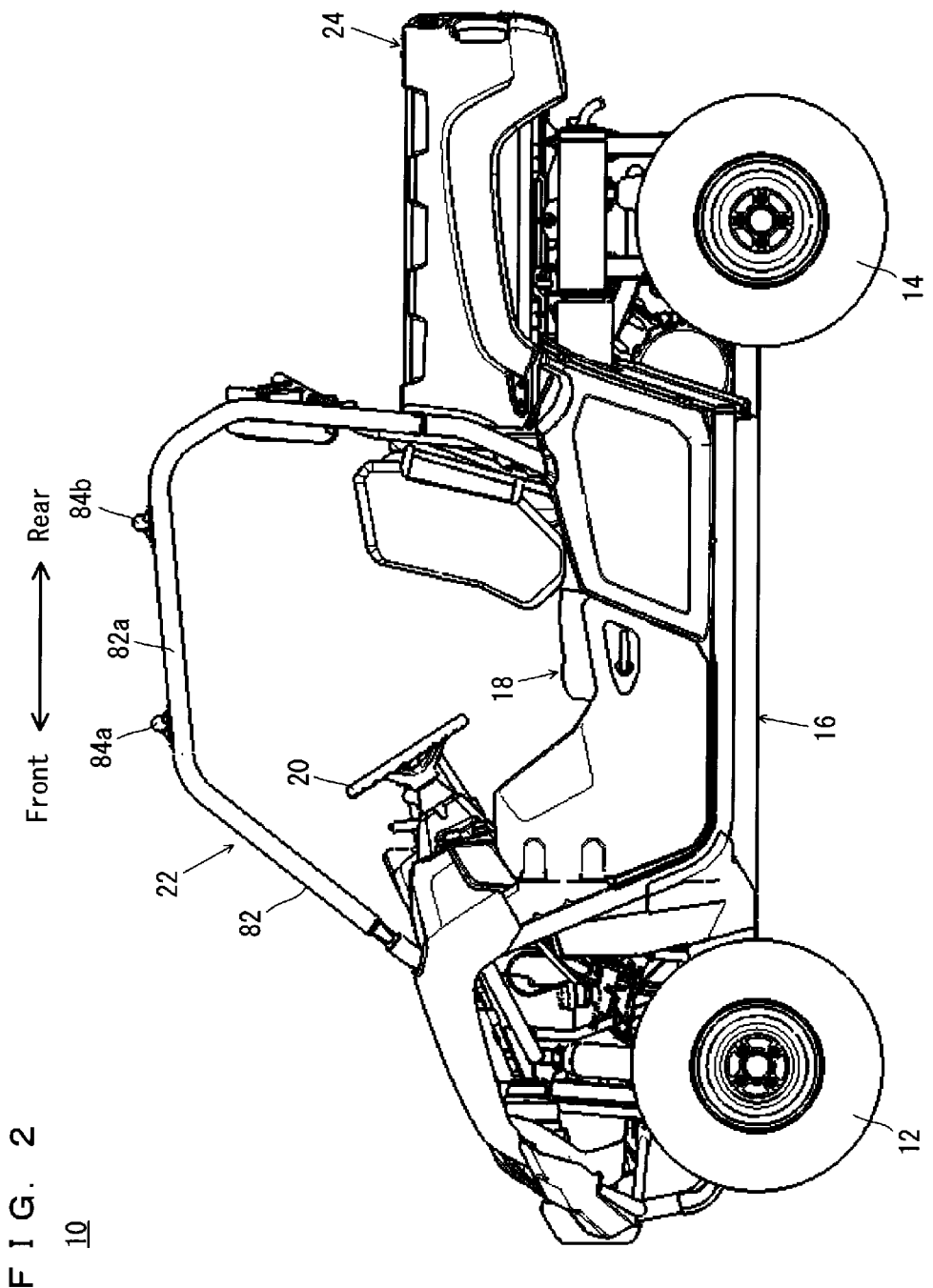
FIG. 2 is a side view of the vehicle.

Hereinafter, preferred embodiments of the present invention will be described with reference to the drawings. It is noted that the terms front and rear, right and left, up and down as used in the description of the preferred embodiments of the present invention are determined from the driver's position on a seat portion 198 of a vehicle 10, with the driver facing toward a steering wheel 20.

Referring to FIG. 1 through FIG. 5, the vehicle 10 according to a preferred embodiment of the present invention is a four-wheel-drive recreational off-highway vehicle (ROV), and includes a pair of front wheels 12, a pair of rear wheels 14, a frame portion 16, a seat unit 18, a steering wheel 20, a roll-over protection cage 22, and a cargo bed 24. The frame portion 16 is supported by the pair of front wheels 12 and the pair of rear wheels 14. Referring to FIG. 6, the frame portion 16 includes a main frame portion 16a supported by the pair of front wheels 12 (see FIG. 1) and the pair of rear wheels 14 (see FIG. 1); and a seat frame portion 16b supported by the main frame portion 16a. The seat unit 18 is supported by the seat frame portion 16b.

Figure 7:
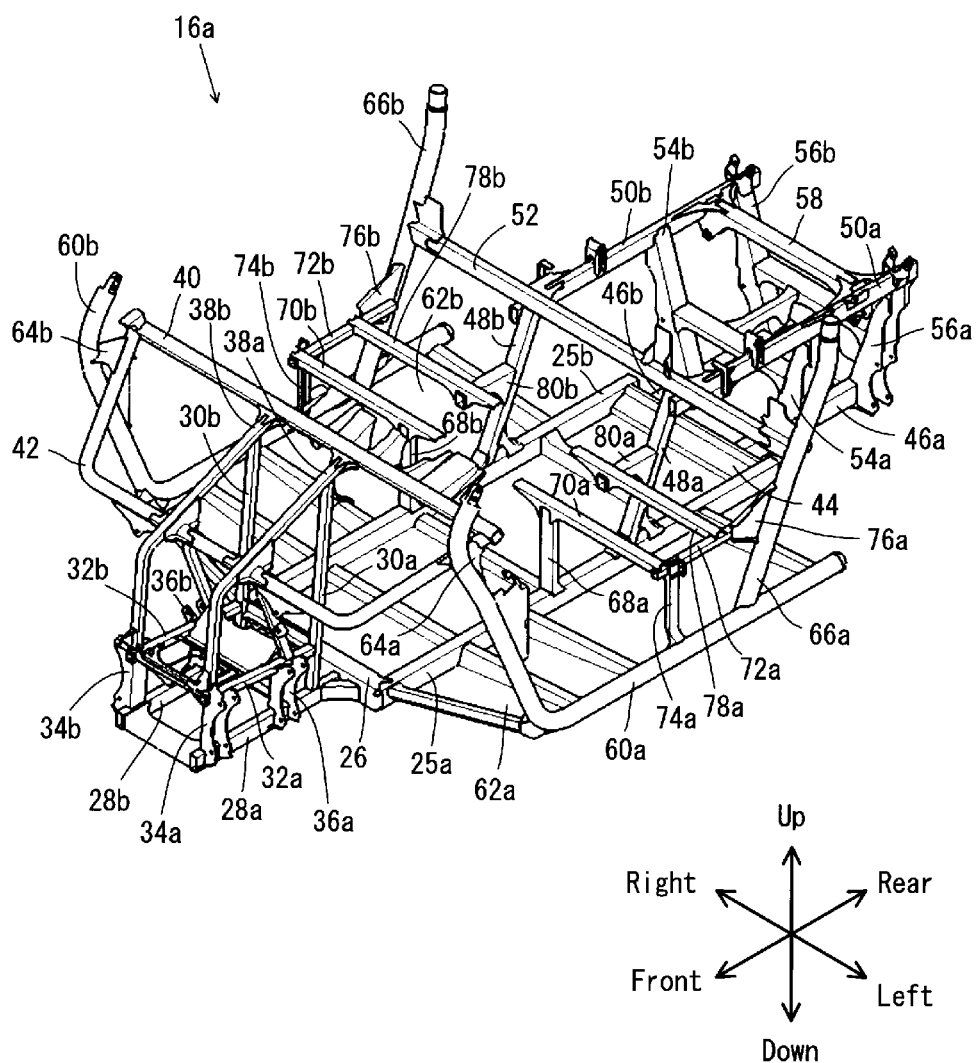
FIG. 7 is a perspective view of a main frame portion.

Referring to FIG. 7, the main frame portion 16a includes a pair of side frame portions 25a, 25b extending in a fore-aft direction. The side frame portion 25a and the side frame portion 25b are parallel or substantially parallel to each other. The side frame portion 25a and the side frame portion 25b have their respective forward ends connected to each other by a cross member 26 extending in a left-right direction (a width direction of the vehicle 10).

From the cross member 26, a pair of side frame portions 28a, 28b extend forward. In the width direction of the vehicle 10, the side frame portions 28a, 28b are on an inner side than the side frame portions 25a, 25b. The side frame portion 28a and the side frame portion 28b are parallel or substantially parallel to each other. A pair of support frame portions 30a, 30b extend upward from respective rearward regions of the side frame portions 28a, 28b.

Above the side frame portions 28a, 28b, a pair of side frame portions 32a, 32b extend forward from the support frame portions 30a, 30b. The side frame portion 32a and the side frame portion 32b are parallel or substantially parallel to each other.

The side frame portions 28a, 28b have their forward end regions connected to respective forward end regions of the side frame portions 32a, 32b by a pair of support frame portions 34a, 34b extending in an up-down direction. The side frame portions 28a, 28b have their rearward regions connected to respective rearward regions of the side frame portions 32a, 32b by a pair of support frame portions 36a, 36b extending in an up-down direction. The support frame portions 36a, 36b are at a more rearward position than the support frame portions 34a, 34b.

The side frame portions 32a, 32b have their forward end regions connected to a pair of support frame portions 38a, 38b. The support frame portions 38a, 38b extend upward from the side frame portions 32a, 32b, and then obliquely in a rearward and upward direction. The support frame portions 30a, 30b have their upper ends connected to respective rearward end regions of the support frame portions 38a, 38b. The support frame portions 38a, 38b have their rear ends connected to a cross member 40 extending in a left-right direction.

From the cross member 40, a U-shaped or substantially U-shaped frame portion 42 extends forward, below the support frame portions 38a, 38b. The U-shaped or substantially U-shaped frame portion 42 includes two end regions connected to respective end regions of the cross member 40. The U-shaped or substantially U-shaped frame portion 42 has an intermediate portion connected to the support frame portions 38a, 38b.

The side frame portion 25a and the side frame portion 25b have their respective rearward end regions connected to each other by a cross member 44 extending in a left-right direction. From the cross member 44, a pair of side frame portions 46a, 46b extend rearward. In the width direction of the vehicle 10, the side frame portions 46a, 46b are on an inner side than the side frame portions 25a, 25b. The side frame portion 46a and the side frame portion 46b are parallel or substantially parallel to each other.

At a more forward position than the cross member 44, a pair of support frame portions 48a, 48b extend obliquely in an upward and rearward direction from the pair of side frame portions 25a, 25b. At a higher position than the side frame portions 46a, 46b, a pair of side frame portions 50a, 50b extend in a fore-aft direction. The side frame portion 50a and the side frame portion 50b are parallel or substantially parallel to each other. In the width direction of the vehicle 10, the side frame portions 50a, 50b are on an outer side than the side frame portions 46a, 46b. The cargo bed 24 (see FIG. 1) is supported by the side frame portions 50a, 50b. The side frame portions 50a, 50b have their forward end regions connected to respective upper end regions of the support frame portions 48a, 48b. The support frame portions 48a, 48b have their upper ends connected to a cross member 52 extending in a left-right direction.

Referring to FIG. 6 and FIG. 7, the side frame portions 46a, 46b and the side frame portions 50a, 50b are connected to each other by a pair of support frame portions 54a, 54b which extend in an up-down direction and a pair of support frame portions 56a, 56b which extend in an up-down direction. The support frame portions 54a, 54b are at a more forward position than the support frame portions 56a, 56b. The side frame portion 50a and the side frame portion 50b are connected to each other by a cross member 58 extending in a left-right direction. The cross member 58 is at a position which is more rearward than the support frame portions 54a, 54b and more forward than the support frame portions 56a, 56b.

In the width direction of the vehicle 10, there is provided a pair of L-shaped or substantially L-shaped support frame portions 60a, 60b on respective outer sides of the side frame portions 25a, 25b. The support frame portion 60a is connected to the side frame portion 25a via a plate frame portion 62a, whereas the support frame portion 60b is connected to the side frame portion 25b via a plate frame portion 62b.

Referring to FIG. 7, the support frame portions 60a, 60b have their upper regions connected to two end regions of the U-shaped or substantially U-shaped frame portion 42 via connecting members 64a, 64b. A pair of support frame portions 66a, 66b extend obliquely in an upward and rearward direction from rearward regions of the support frame portions 60a, 60b. The support frame portions 66a, 66b have their substantially intermediate regions connected to two end regions of the cross member 52.

A pair of support frame portions 68a, 68b extend upward from substantially intermediate regions of the side frame portions 25a, 25b. A pair of support frame portions 70a, 70b extend in a left-right direction, being supported by upper ends of the support frame portions 68a, 68b. The support frame portion 70a has an end region (left end region in the present preferred embodiment) connected to a forward end region of a support frame portion 72a which extends in a fore-aft direction, whereas the support frame portion 70b has an end region (right end region in the present preferred embodiment) connected to a forward end region of a support frame portion 72b which extends in a fore-aft direction.

The support frame portion 72a has a forward region connected to the support frame portion 60a by a support frame portion 74a which extends in an up-down direction, whereas the support frame portion 72b has a forward region connected to the support frame portion 60b by a support frame portion 74b which extends in an up-down direction. The support frame portion 72a has a rearward region connected to the support frame portion 66a via a connecting member 76a, whereas the support frame portion 72b has a rearward region connected to the support frame portion 66b via a connecting member 76b.

Behind the support frame portion 70a, a support frame portion 78a is parallel or substantially parallel to the support frame portion 70a, whereas behind the support frame portion 70b, a support frame portion 78b is parallel or substantially parallel to the support frame portion 70b. The support frame portion 78a has an end region (left end region in the present preferred embodiment) connected to the support frame portion 72a, whereas the support frame portion 78b has an end region (right end region in the present preferred embodiment) connected to the support frame portion 72b.

A pair of support frame portions 80a, 80b extend forward from substantially intermediate regions of the support frame portions 48a, 48b. The support frame portions 80a, 80b have their forward end regions connected to the support frame portions 78a, 78b.

Referring to FIG. 6 and FIG. 7, the seat unit 18 is supported by the support frame portions 70a, 70b, 78a, 78b of the main frame portion 16a via the seat frame portion 16b. Referring to FIG. 1, the steering wheel 20 is in front of the seat portion 198, which will be described later, of the seat unit 18. The roll-over protection cage 22 covers the seat unit 18 and the steering wheel 20. The roll-over protection cage 22 is supported by the frame portion 16.

Figure 8:
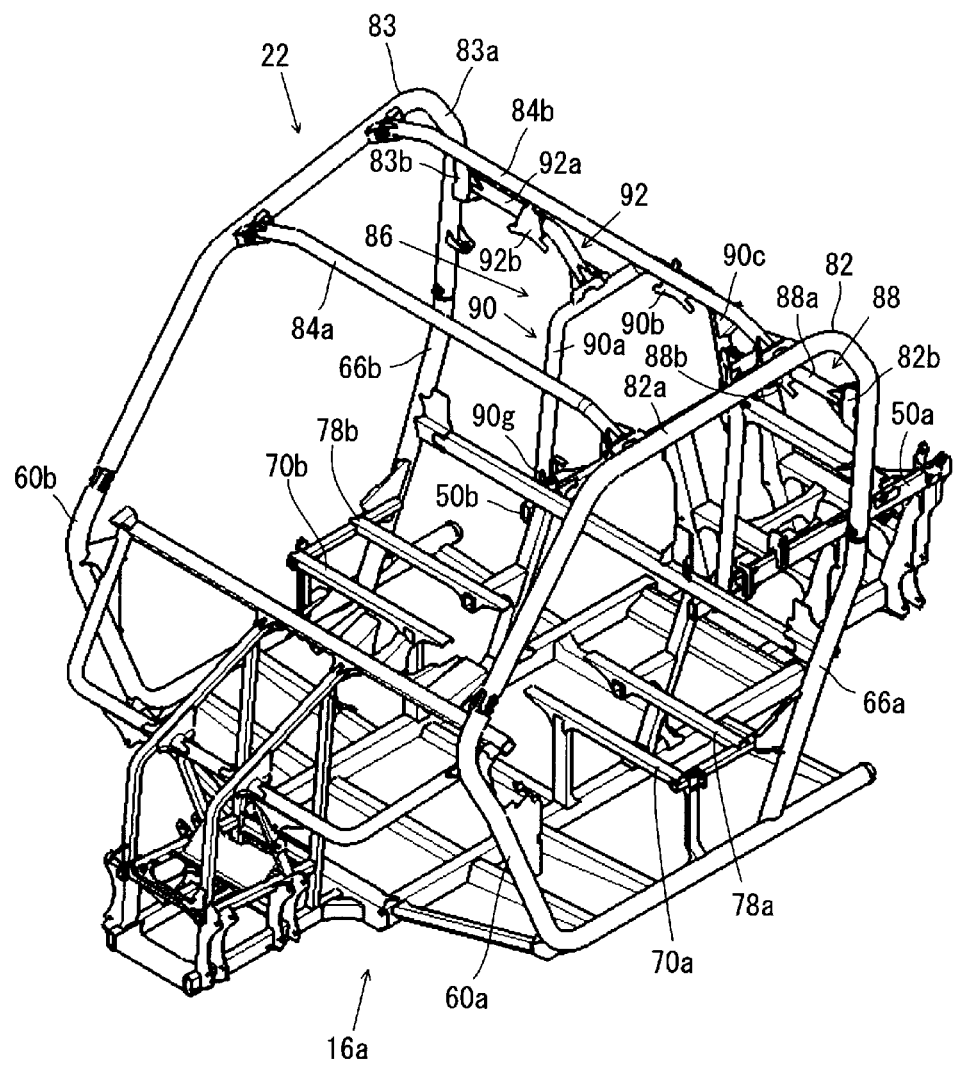
FIG. 8 is a perspective view of the main frame portion and the roll-over protection cage.

Referring to FIG. 8, the roll-over protection cage 22 includes a pair of side cage members 82, 83 extending in a fore-aft direction; a pair of roof members 84a, 84b extending in a left-right direction; and a cross member portion 86 extending in a left-right direction.

The side cage member 82 includes a main body portion 82a which has a shape of an inverted letter of U or a shape substantially of an inverted letter of U, in a side view; and a connecting portion 82b at a rearward region of the main body portion 82a. The connecting portion 82b protrudes inward (rightward in the present preferred embodiment) from the main body portion 82a in the width direction of the vehicle 10. The side cage member 83 includes a main body portion 83a which has a shape of an inverted letter of U or a shape substantially of an inverted letter of U, in a side view; and a connecting portion 83b at a rearward region of the main body portion 83a. The connecting portion 83b protrudes inward (leftward in the present preferred embodiment) from the main body portion 83a in the width direction of the vehicle 10.

The main body portions 82a, 83a are supported by the frame portion 16. More specifically, the main body portion 82a includes an end region (forward end region in the present preferred embodiment), which is connected to an upper end region of the support frame portion 60a; and the main body portion 82a includes another end region (rearward end region in the present preferred embodiment), which is connected to an upper end region of the support frame portion 66a. The main body portion 82a is fixed to the support frame portions 60a, 66a with, e.g., fasteners (such as bolts and nuts). Likewise, the main body portion 83a includes an end region (forward end region in the present preferred embodiment), which is connected to an upper end region of the support frame portion 60b; and the main body portion 83a includes another end region (rearward end region in the present preferred embodiment), which is connected to an upper end region of the support frame portion 66b. The main body portion 83a is fixed to the support frame portions 60b, 66b with, e.g., fasteners (such as bolts and nuts).

The roof members 84a, 84b connect an upper region of the side cage member 82 to an upper region of the side cage member 83. The roof member 84b is at a more rearward position than the roof member 84a.

Figure 3:
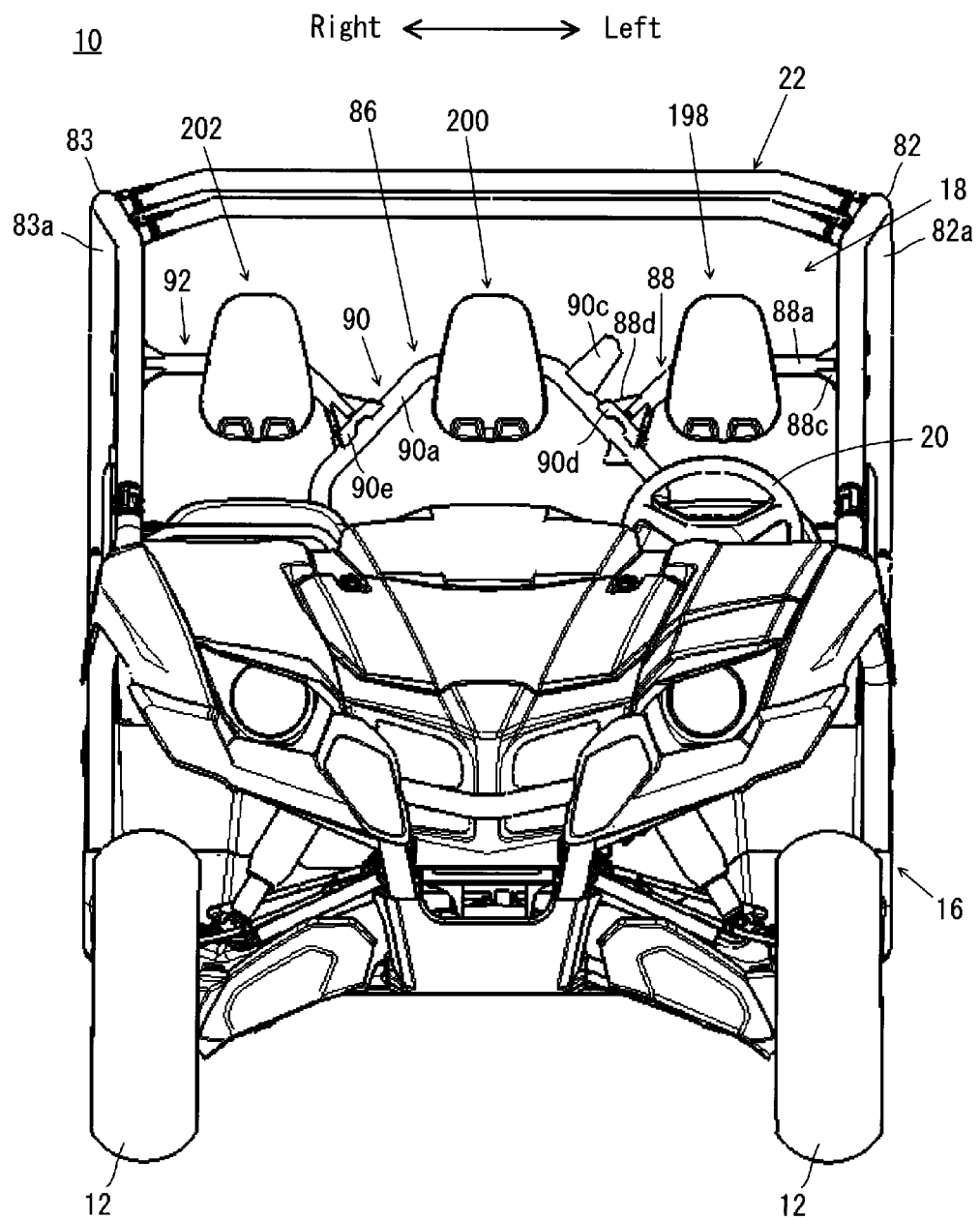
FIG. 3 is a front view of the vehicle.
Figure 5:
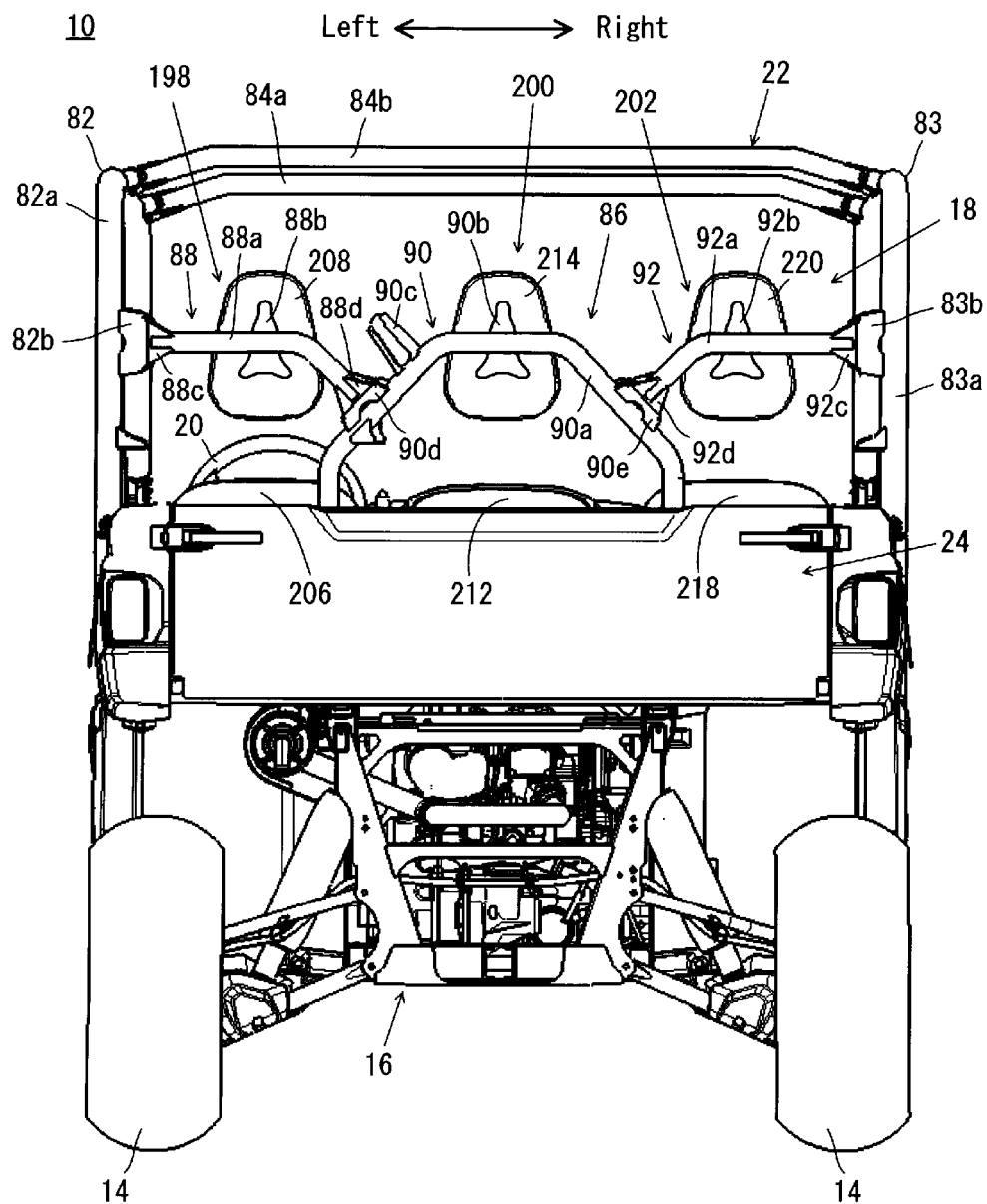
FIG. 5 is a rear view of the vehicle.
Figure 6:
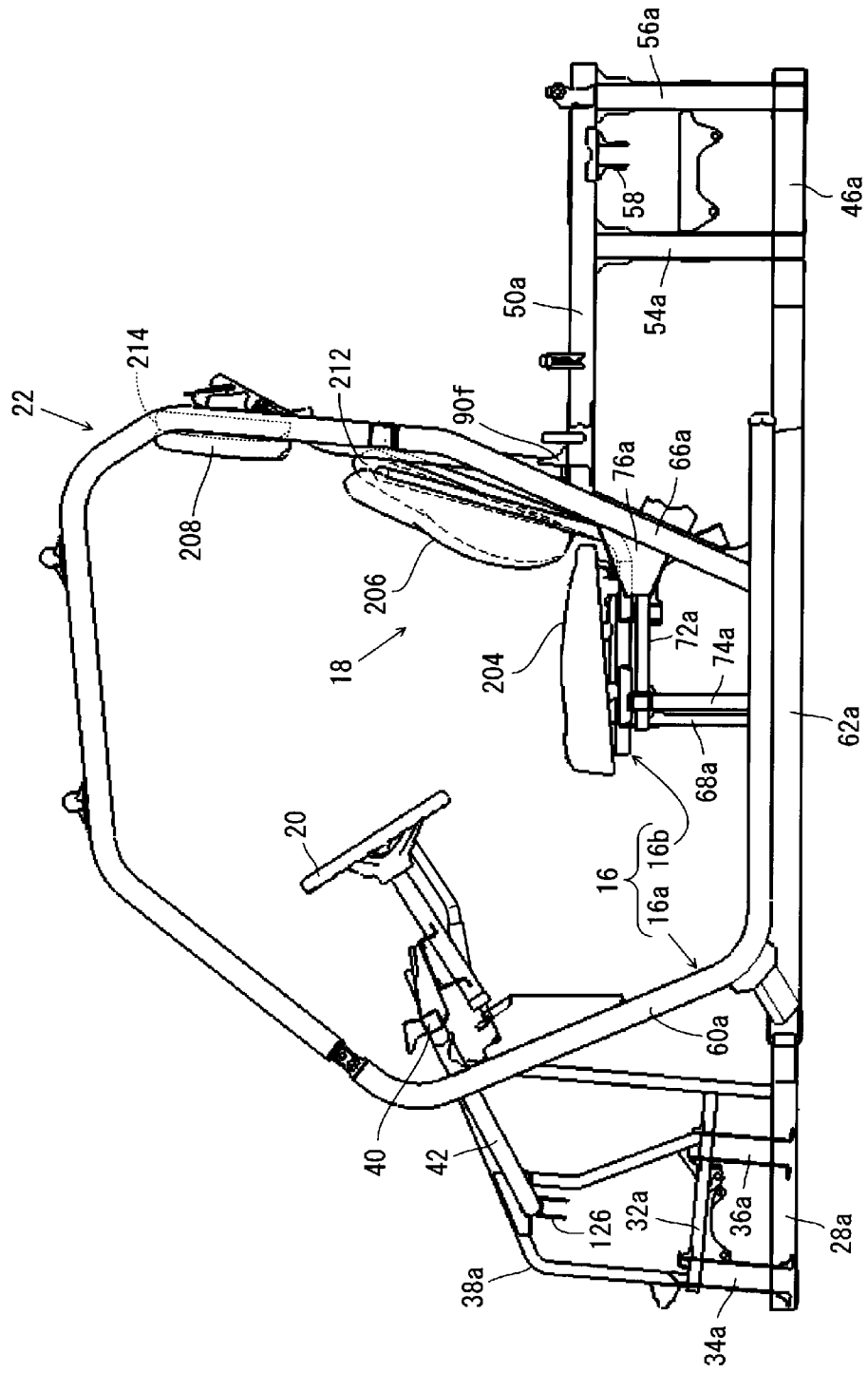
FIG. 6 is a side view showing a frame portion, a seat unit, a steering wheel and a roll-over protection cage.

Referring to FIG. 3, FIG. 5 and FIG. 8, the cross member portion 86 includes a support member 88, a support member 90 and a support member 92. The support member 90 is at an intermediate portion in the width direction of the vehicle 10, the support member 88 connects the support member 90 and the side cage member 82 to each other, and the support member 92 connects the support member 90 and the side cage member 83 to each other.

Referring to FIG. 5, the support member 88 includes a main body portion 88a extending in a left-right direction; a mounting portion 88b fixed to an intermediate region of the main body portion 88a; a connecting portion 88c fixed to an end region (left end region in the present preferred embodiment) of the main body portion 88a; and a connecting portion 88d fixed to another end region (right end region in the present preferred embodiment) of the main body portion 88a. A headrest portion 208, which will be described later, of the seat unit 18, is attached to the mounting portion 88b. The connecting portion 88c is connected detachably from/attachably to the connecting portion 82b of the side cage member 82. Specifically, the connecting portion 88c is connected to the connecting portion 82b of the side cage member 82 with unillustrated fasteners (such as bolts and nuts), for example. The connecting portion 88d is connected to a connecting portion 90d, which will be described later, of the support member 90 with unillustrated fasteners (such as bolts and nuts), for example.

Figure 4:
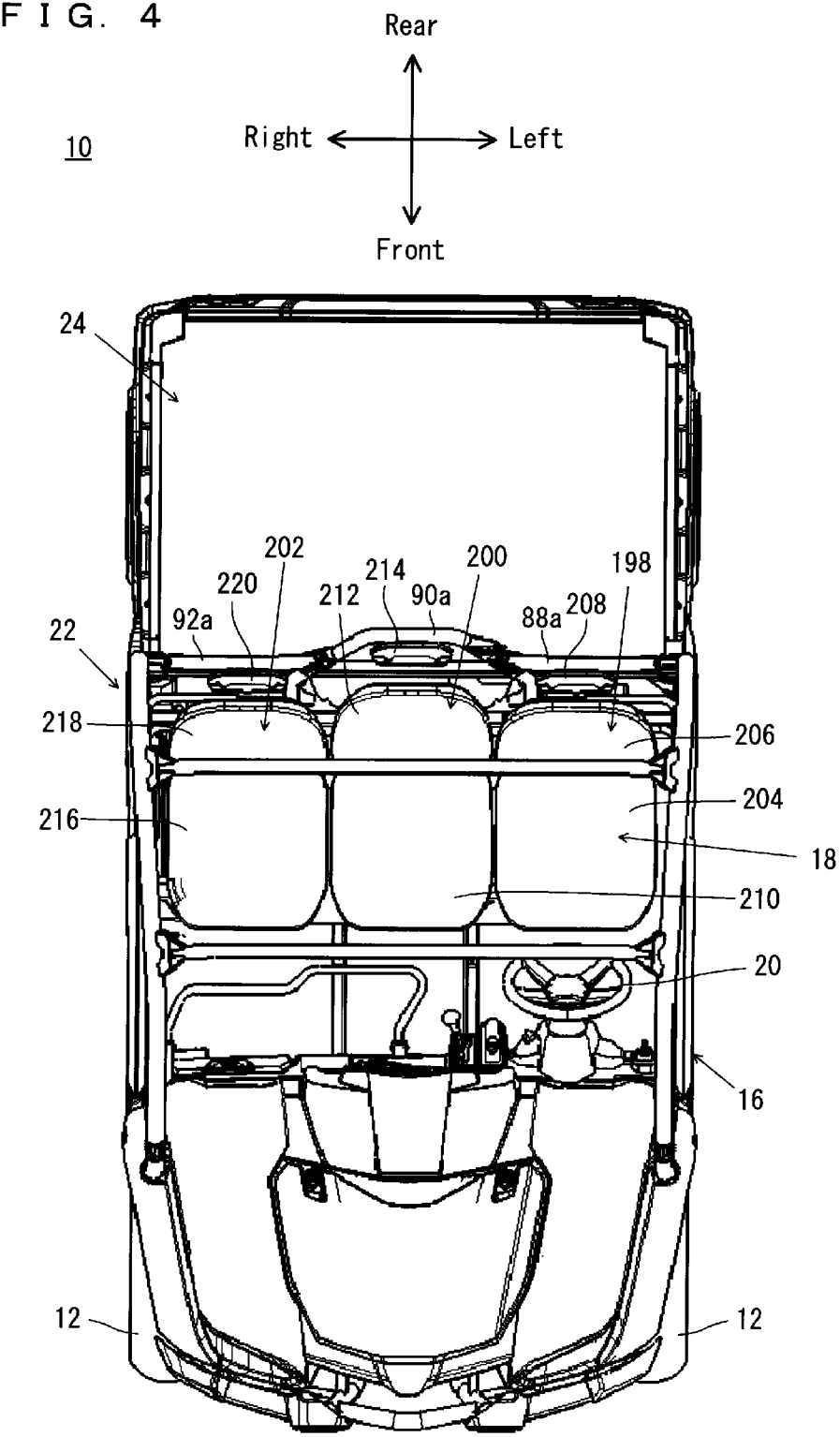
FIG. 4 is a plan view of the vehicle.

Referring to FIG. 5 and FIG. 8, the support member 90 includes a main body portion 90a which has a shape of an inverted letter of U or a shape substantially of an inverted letter of U, in a front view; a mounting portion 90b located at an upper end region, i.e., an intermediate region, of the main body portion 90a; and a mounting portion 90c which extends obliquely upward from the main body portion 90a on a side closer to the support member 88 when viewed from the mounting portion 90b. Referring to FIG. 4, the upper end region of the main body portion 90a is at a more rearward position than the main body portion 88a and a main body portion 92a to be described later. Therefore, referring to FIG. 5 and FIG. 8, the mounting portion 90b is at a more rearward position than the mounting portion 88b and a mounting portion 92b to be described later.

Referring to FIG. 5, a headrest portion 214, which will be described later, of the seat unit 18 is attached to the mounting portion 90b. To the mounting portion 90c, a seat belt unit (not illustrated) for a seat portion 200 which will be described later is attached for example.

The support member 90 further includes a pair of connecting portions 90d, 90e fixed to the main body portion 90a. The connecting portion 90d is on a side closer to the support member 88 than the mounting portion 90c when viewed from the mounting portion 90b, whereas the connecting portion 90e is on a side closer to the support member 92 when viewed from the mounting portion 90b. As has been described earlier, the connecting portion 90d is connected to the connecting portion 88d of the support member 88. The connecting portion 90e is connected to a connecting portion 92d, which will be described later, of the support member 92 with unillustrated fasteners (such as bolts and nuts), for example.

Referring to FIG. 6 and FIG. 8, the support member 90 further includes a pair of connecting portions 90f, 90g fixed to two end regions of the main body portion 90a. The main body portion 90a has two end regions connected detachably from/attachably to the side frame portions 50a, 50b via the connecting portions 90f, 90g. Specifically, the connecting portions 90f, 90g of the support member 90 are connected to the side frame portions 50a, 50b with unillustrated fasteners (such as bolts and nuts), for example.

Referring to FIG. 5, the support member 92 includes a main body portion 92a extending in a left-right direction; a mounting portion 92b fixed to an intermediate region of the main body portion 92a; a connecting portion 92c fixed to an end region (right end region in the present preferred embodiment) of the main body portion 92a; and a connecting portion 92d fixed to another end region (left end region in the present preferred embodiment) of the main body portion 92a. To the mounting portion 92b, a headrest portion 220, which will be described later, of the seat unit 18 is attached. The connecting portion 92c is connected detachably from/attachably to the connecting portion 83b of the side cage member 83. Specifically, the connecting portion 92c is connected to the connecting portion 83b of the side cage member 83 with unillustrated fasteners (such as bolts and nuts), for example. As has been described earlier, the connecting portion 92d is connected to the connecting portion 90e of the support member 90.

Due to the arrangement described above, the cross member portion 86 is attached detachably from/attachably to the side frame portions 50a, 50b of the frame portion 16 and the side cage members 82, 83 of the roll-over protection cage 22.

Referring to FIG. 9 through FIG. 12, the vehicle 10 further includes a pair of suspension assemblies 94a, 94b which suspend the pair of front wheels 12 (see FIG. 1); a rotation transmission portion 96 which transmits rotation from an engine 178 (see FIG. 13), which will be described later, to the pair of front wheels 12; a pair of suspension assemblies 98a, 98b which suspend the pair of rear wheels 14 (see FIG. 1); a rotation transmission portion 100 which transmits rotation from the engine 178 to the pair of rear wheels 14; and a rear stabilizer 102 which connects the suspension assemblies 98a, 98b to each other. The frame portion 16 (see FIG. 1) is supported by the pair of front wheels 12 and the pair of rear wheels 14 via the suspension assemblies 94a, 94b, 98a, 98b. In the present preferred embodiment, the suspension assemblies 94a, 94b, 98a, 98b preferably are double wishbone type suspension assemblies, for example.

Figure 9:
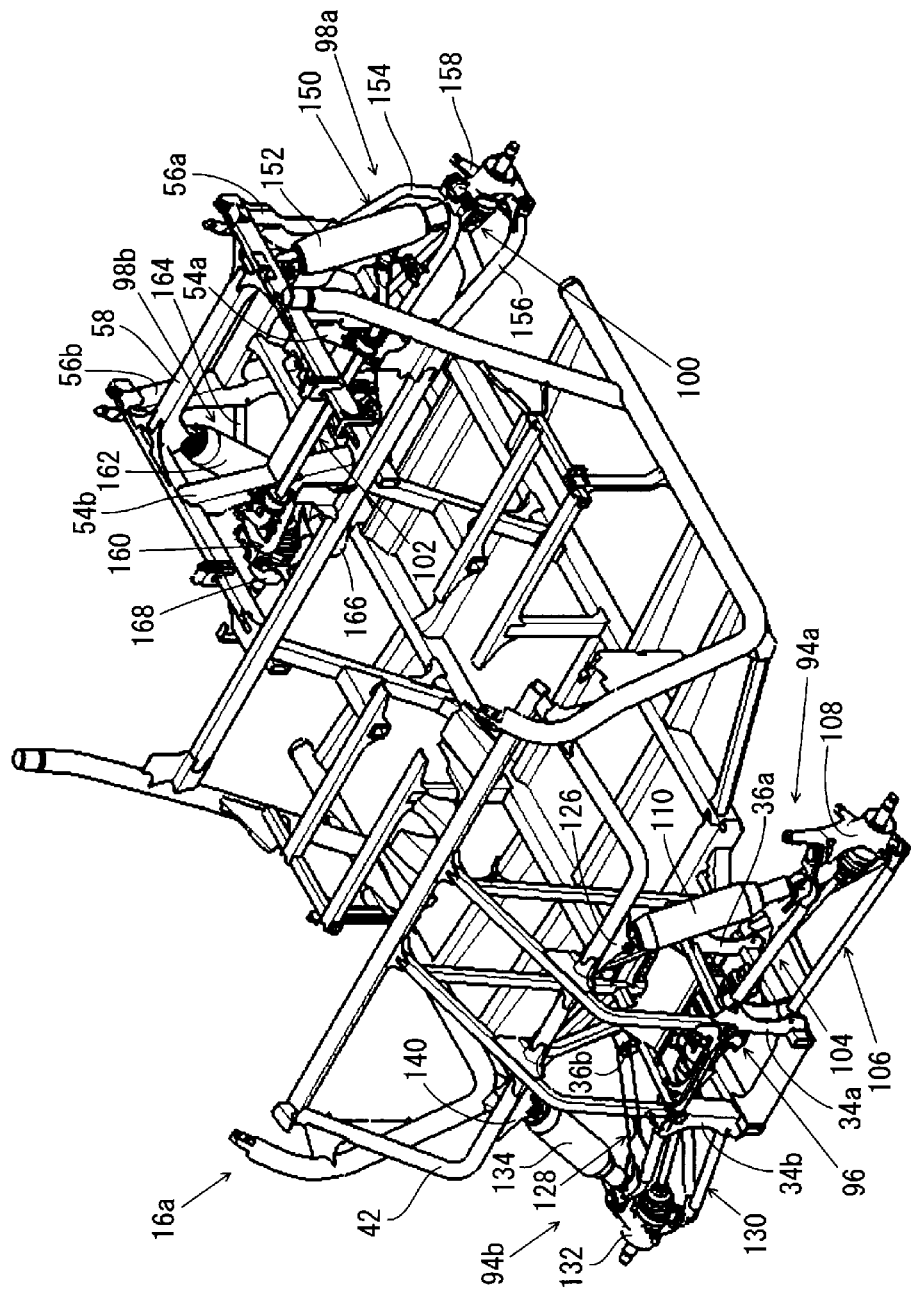
FIG. 9 is a perspective view of the main frame portion, a pair of suspension assemblies for front wheels, a rotation transmission portion for the front wheels, a pair of suspension assemblies for rear wheels, and a rotation transmission portion for the rear wheels.
Figure 10:
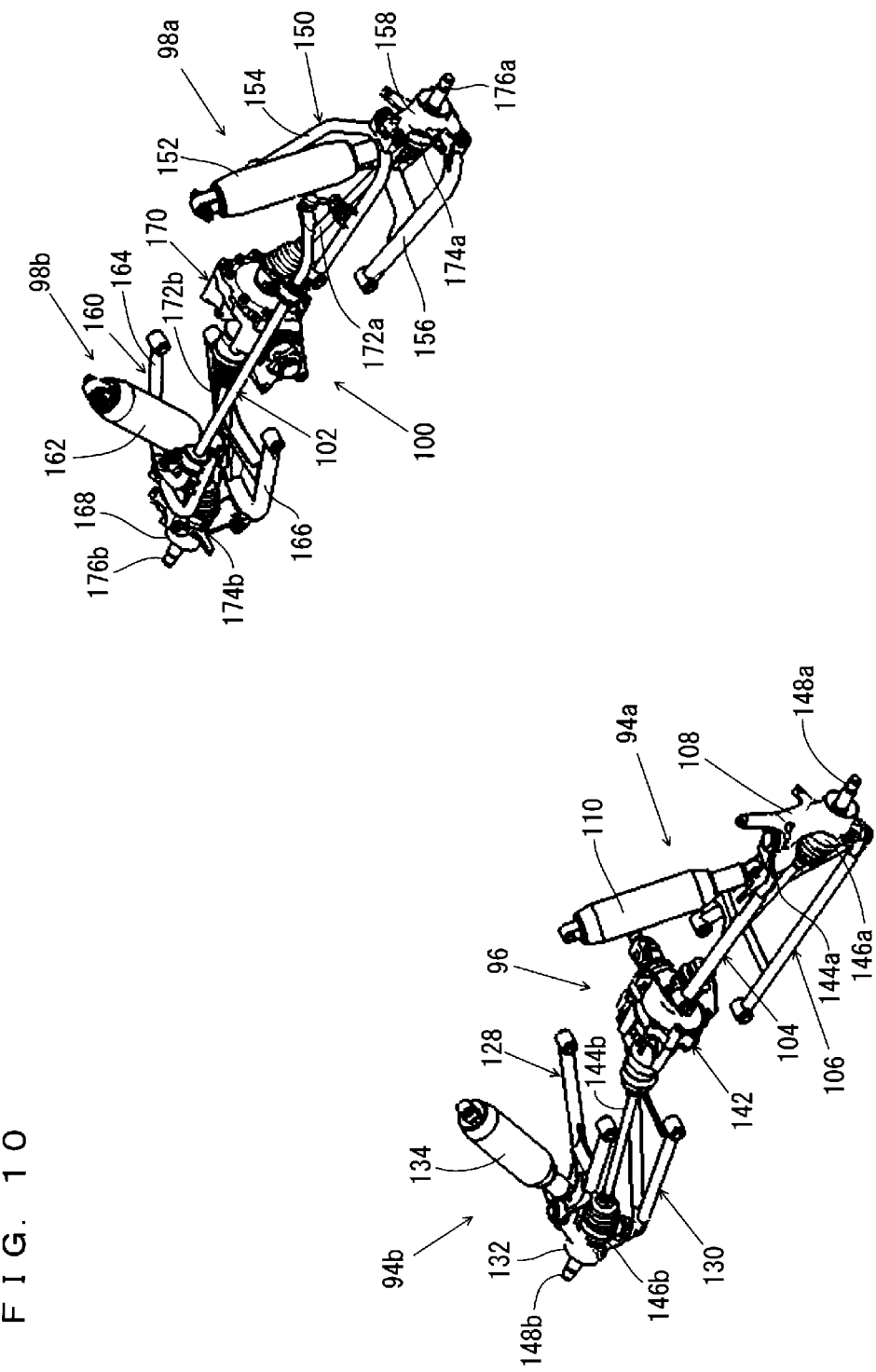
FIG. 10 is a perspective view showing the pair of suspension assemblies for front wheels and the pair of suspension assemblies for rear wheels.
Figure 11:
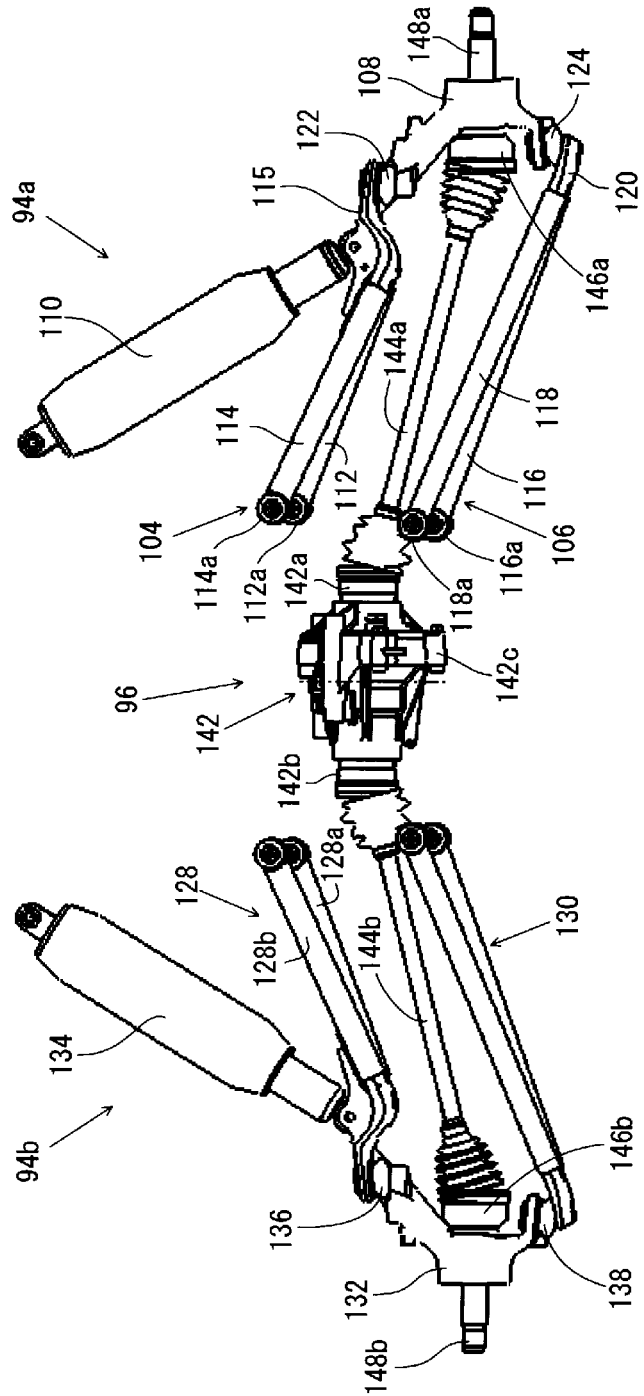
FIG. 11 is a front view showing the pair of suspension assemblies for front wheels and the rotation transmission portion for the front wheels.

Referring to FIG. 9, the suspension assembles 94a, 94b are at a front region of the frame portion 16 (see FIG. 6), whereas the suspension assemblies 98a, 98b are at a rear region of the frame portion 16. Referring to FIG. 10 and FIG. 11, the suspension assembly 94a includes an upper arm 104, a lower arm 106, a knuckle arm 108 and a shock absorber 110. The upper arm 104 and the lower arm 106 are provided by A arms, for example.

Referring to FIG. 11, the upper arm 104 includes a rear arm portion 112 which includes a first end portion 112a; a front arm portion 114 which includes a second end portion 114a and is at a more forward position than the rear arm portion 112; and a connecting portion 115 which connects the rear arm portion 112 and the front arm portion 114 to each other.

The first end portion 112a is an end region (right end region in the present preferred embodiment) of the rear arm portion 112, whereas the second end portion 114a is an end region (right end region in the present preferred embodiment) of the front arm portion 114. The connecting portion 115 connects another end region (left end region in the present preferred embodiment) of the rear arm portion 112 and another end region (left end region in the present preferred embodiment) of the front arm portion 114 to each other. Specifically, the connecting portion 115 connects the rear arm portion 112 and the front arm portion 114 to each other, on a side spaced away from the first end portion 112a and the second end portion 114a in the width direction of the vehicle 10.

The lower arm 106 includes a rear arm portion 116 which includes a first end portion 116a; a front arm portion 118 which includes a second end portion 118a and is at a more forward position than the rear arm portion 116; and a connecting portion 120 which connects the rear arm portion 116 and the front arm portion 118 to each other.

The first end portion 116a is an end region (right end region in the present preferred embodiment) of the rear arm portion 116, whereas the second end portion 118a is an end region (right end region in the present preferred embodiment) of the front arm portion 118. The connecting portion 120 connects another end region (left end region in the present preferred embodiment) of the rear arm portion 116 and another end region (left end region in the present preferred embodiment) of the front arm portion 118 to each other.

Referring to FIG. 9, the upper arm 104 is supported by the support frame portions 34a, 36a pivotably in an up-down direction. More specifically, referring to FIG. 11, the first end portion 112a of the rear arm portion 112 is supported pivotably in an up-down direction at an upper end region of the support frame portion 36a (see FIG. 9), whereas the second end portion 114a of the front arm portion 114 is supported pivotably in an up-down direction at an upper end region of the support frame portion 34a (see FIG. 9).

Referring to FIG. 9, the lower arm 106 is supported by the support frame portions 34a, 36a pivotably in an up-down direction at a lower position than the upper arm 104. More specifically, referring to FIG. 11, the first end portion 116a of the rear arm portion 116 is supported pivotably in an up-down direction at a lower end region of the support frame portion 36a (see FIG. 9), whereas the second end portion 118a of the front arm portion 118 is supported pivotably in an up-down direction at a lower end region of the support frame portion 34a (see FIG. 9).

The connecting portion 115 of the upper arm 104 is connected to an upper end region of the knuckle arm 108 via a ball joint 122, whereas the connecting portion 120 of the lower arm 106 is connected to a lower end region of the knuckle arm 108 via a ball joint 124. Thus, the upper arm 104 and the lower arm 106 are pivotable in an up-down direction with respect to the knuckle arm 108. Also, the knuckle arm 108 is pivotable in a fore-aft direction with respect to the upper arm 104 and the lower arm 106.

The shock absorber 110 has a lower end region supported pivotably in a left-right direction by the upper arm 104 (the connecting portion 115). Referring to FIG. 9, the shock absorber 110 has an upper end region supported pivotably in a left-right direction by the U-shaped or substantially U-shaped frame portion 42 via a support member 126. Referring to FIG. 6, the support member 126 has a shape of an inverted letter of U or substantially a shape of an inverted letter of U in a side view, and is fixed to the U-shaped or substantially U-shaped frame portion 42.

Referring to FIG. 10 and FIG. 11, the suspension assembly 94b preferably is symmetrical to the suspension assembly 94a in a left-right direction, and includes an upper arm 128, a lower arm 130, a knuckle arm 132, and a shock absorber 134. The knuckle arm 132 is connected to the upper arm 128 and the lower arm 130 via ball joints 136, 138.

The shock absorber 134 has a lower end region supported by the upper arm 128 pivotably in a left-right direction. Referring to FIG. 9, the shock absorber 134 has an upper end region supported pivotably in a left-right direction by the U-shaped or substantially U-shaped frame portion 42 via a support member 140. Like the support member 126, the support member 140 has a shape of an inverted letter of U in a side view or substantially a shape of an inverted letter of U, and is fixed to the U-shaped or substantially U-shaped frame portion 42.

Referring to FIG. 10 and FIG. 11, the rotation transmission portion 96 includes a differential device 142, a pair of drive shafts 144a, 144b, a pair of constant-velocity joints 146a, 146b, and a pair of axles 148a, 148b. The differential device 142 is located between the suspension assembly 94a and the suspension assembly 94b in the width direction of the vehicle 10. The differential device 142 is supported by the main frame portion 16a. The differential device 142 is connected to the engine 178 (see FIG. 13) which will be described later, via a propeller shaft 180 (see FIG. 13) which will be described later.

Referring to FIG. 11, the differential device 142 includes a pair of constant-velocity joints 142a, 142b and a main body portion 142c. The constant-velocity joint 142a is on a left end region of the main body portion 142c, whereas the constant-velocity joint 142b is on a right end region of the main body portion 142c. The drive shafts 144a, 144b extend in a left-right direction, to connect the constant-velocity joints 142a, 142b with the constant-velocity joints 146a, 146b. More specifically, the drive shaft 144a extends obliquely in a leftward and downward direction from the constant-velocity joint 142a and is connected to the constant-velocity joint 146a, whereas the drive shaft 144b extends obliquely in a rightward and downward direction from the constant-velocity joint 142b and is connected to the constant-velocity joint 146b. The drive shaft 144a passes below the upper arm 104 and above the lower arm 106, whereas the drive shaft 144b passes below the upper arm 128 and above the lower arm 130. In the present preferred embodiment, in a front view, the drive shaft 144a passes between the upper arm 104 and the lower arm 106, whereas the drive shaft 144b passes between the upper arm 128 and the lower arm 130.

The constant-velocity joint 146a and the axle 148a are connected to each other and are supported rotatably by the knuckle arm 108. The constant-velocity joint 146b and the axle 148b are connected to each other and are supported rotatably by the knuckle arm 132. The axle 148a supports the left front wheel 12 (see FIG. 1), whereas the axle 148b supports the right front wheel 12 (see FIG. 1).

The suspension assemblies 98a, 98b and the rotation transmission portion 100 can be any known component, so the suspension assemblies 98a, 98b and the rotation transmission portion 100 will be described only briefly.

Figure 12:
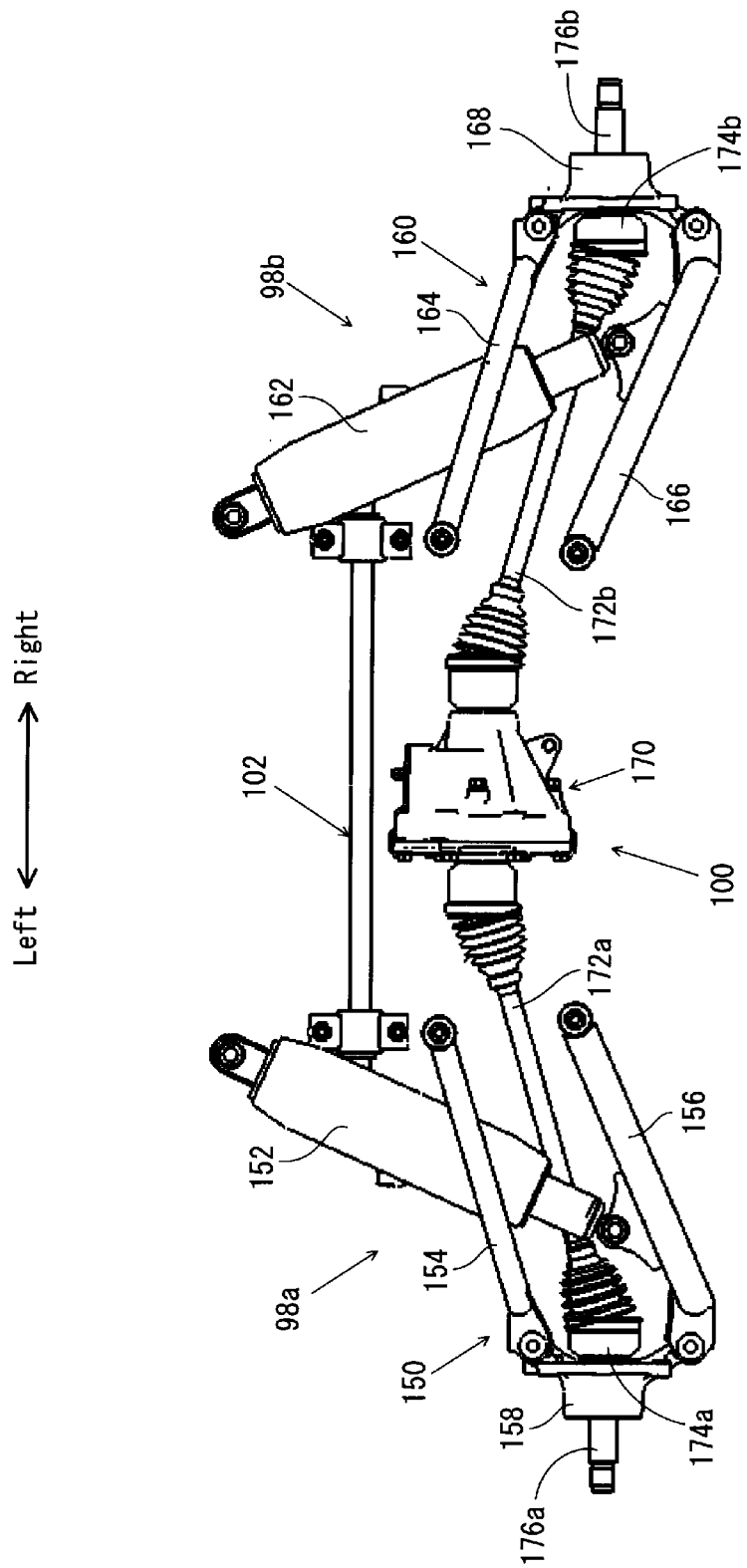
FIG. 12 is a rear view showing the pair of suspension assemblies for rear wheels, the rotation transmission portion for the rear wheels, and a rear stabilizer.

Referring to FIG. 10 and FIG. 12, the suspension assembly 98a includes an arm portion 150 and a shock absorber 152. In the present preferred embodiment, the arm portion 150 includes an upper arm 154, a lower arm 156 and a knuckle arm 158. Referring to FIG. 9, the upper arm 154 is supported by the support frame portions 54a, 56a pivotably in an up-down direction. The lower arm 156 is supported by the support frame portions 54a, 56a pivotably in an up-down direction at a lower position than the upper arm 154. More specifically, the upper arm 154 is supported at substantially intermediate regions in an up-down direction of the support frame portions 54a, 56a, whereas the lower arm 156 is supported by lower end regions of the support frame portions 54a, 56a. The shock absorber 152 connects the main frame portion 16a and the arm portion 150 (lower arm 156 in the present preferred embodiment) to each other. More specifically, the shock absorber 152 has an upper end region supported pivotably by an end region (left end region in the present preferred embodiment) of the cross member 58, whereas the shock absorber 152 has a lower end region supported pivotably by the lower arm 156.

Referring to FIG. 10 and FIG. 12, the suspension assembly 98b preferably is symmetrical with the suspension assembly 98a in a left-right direction, and includes an arm portion 160 and a shock absorber 162. In the present preferred embodiment, the arm portion 160 includes an upper arm 164, a lower arm 166 and a knuckle arm 168. Referring to FIG. 9, the upper arm 164 is supported by the support frame portions 54b, 56b pivotably in an up-down direction. The lower arm 166 is supported by the support frame portions 54b, 56b pivotably in an up-down direction at a lower position than the upper arm 164. More specifically, the upper arm 164 is supported at substantially intermediate regions in an up-down direction of the support frame portions 54b, 56b, whereas the lower arm 166 is supported by lower end regions of the support frame portions 54b, 56b. The shock absorber 162 connects the main frame portion 16a and the arm portion 160 (lower arm 166 in the present preferred embodiment) to each other. More specifically, the shock absorber 162 has an upper end region supported pivotably by another end region (right end region in the present preferred embodiment) of the cross member 58, whereas the shock absorber 162 has a lower end region supported pivotably by the lower arm 166.

Referring to FIG. 10, the rear stabilizer 102 is at a more forward position than the shock absorbers 152, 162, and connects the arm portion 150 of the suspension assembly 98a and the arm portion 160 of the suspension assembly 98b to each other. In the present preferred embodiment, the rear stabilizer 102 connects the upper arm 154 and the upper arm 164 to each other.

Referring to FIG. 10 and FIG. 12, the rotation transmission portion 100 includes a differential device 170, a pair of drive shafts 172a, 172b, a pair of constant-velocity joints 174a, 174b, and a pair of axles 176a, 176b. The differential device 170 is located between the suspension assembly 98a and the suspension assembly 98b in the width direction of the vehicle 10. The differential device 170 is supported by the main frame portion 16a. The differential device 170 is connected to the engine 178 (see FIG. 13) which will be described later, via a propeller shaft 182 (see FIG. 13) which will be described later.

The drive shafts 172a, 172b connects the differential device 170 with the constant-velocity joints 174a, 174b. The constant-velocity joint 174a and the axle 176a are connected to each other and are supported rotatably by the knuckle arm 158. The constant-velocity joint 174b and the axle 176b are connected to each other and are supported rotatably by the knuckle arm 168. The axle 176a supports the left rear wheel 14 (see FIG. 5), whereas the axle 176b supports the right rear wheel 14 (see FIG. 5).

Figure 13:
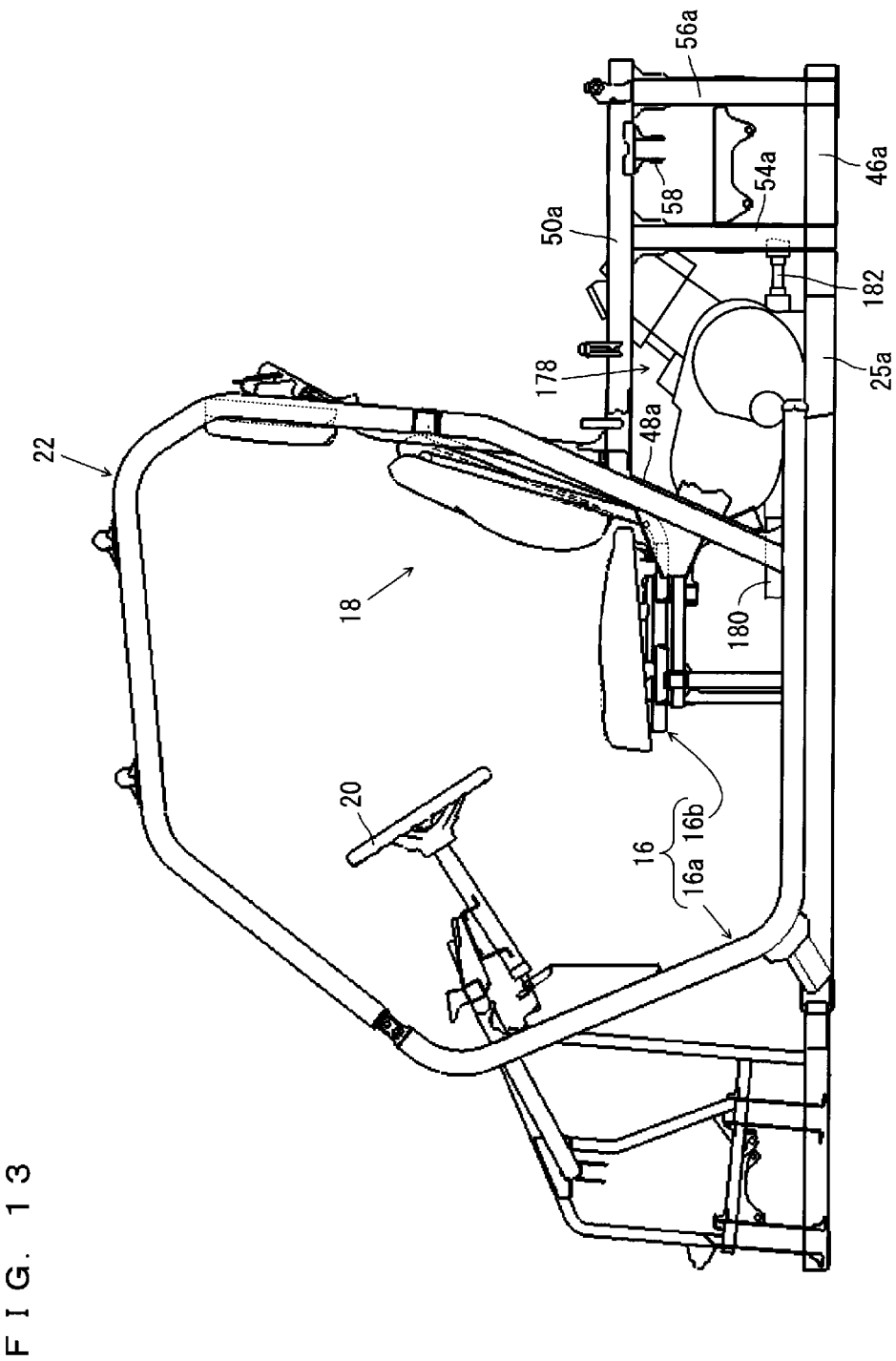
FIG. 13 is a side view showing the frame portion, the seat unit, the steering wheel, the roll-over protection cage, an engine and a pair of propeller shafts.
Figure 14:
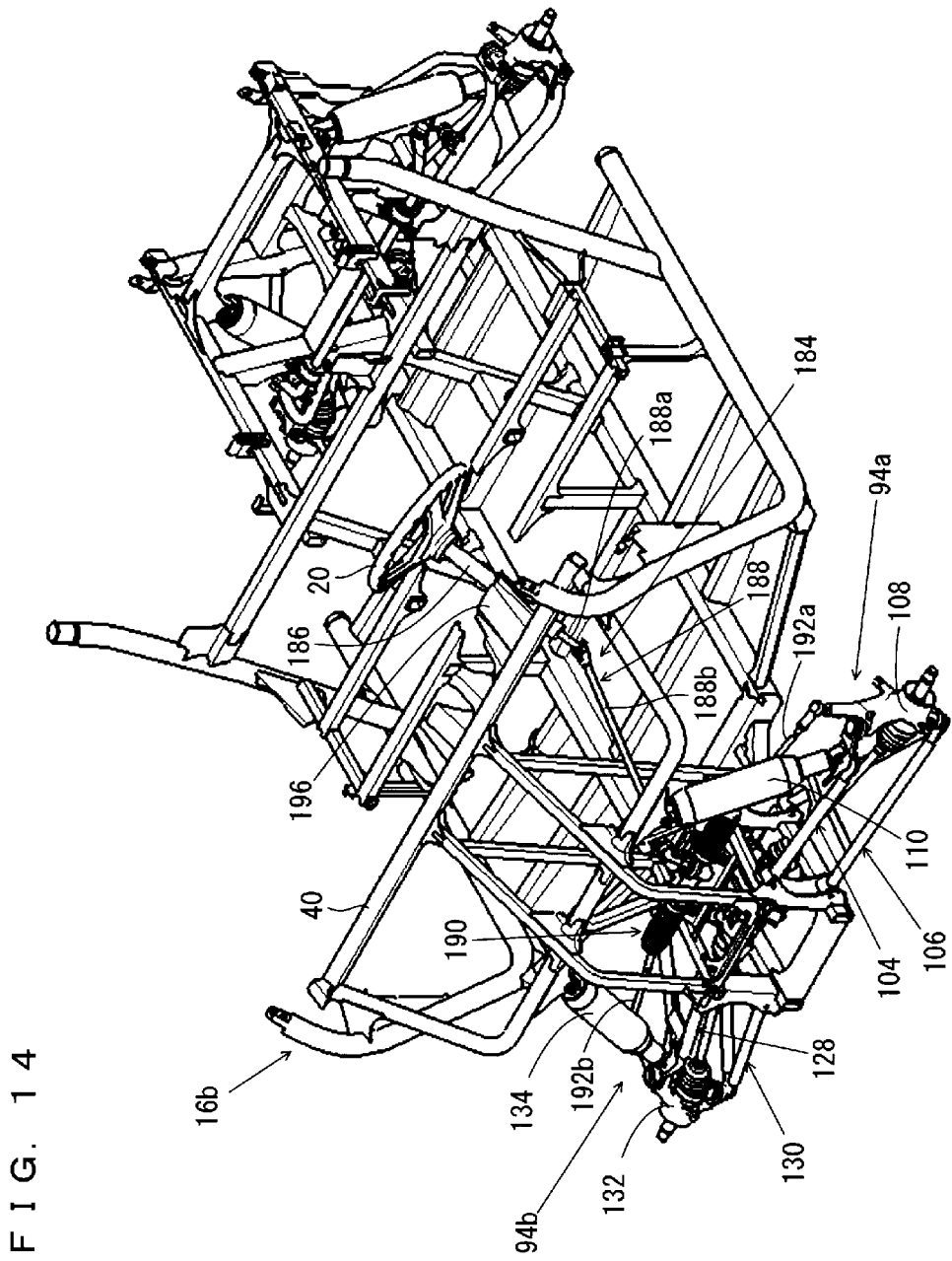
FIG. 14 is a perspective view of the main frame portion, showing a state where the steering wheel and a transfer mechanism are mounted thereon.
Figure 15:
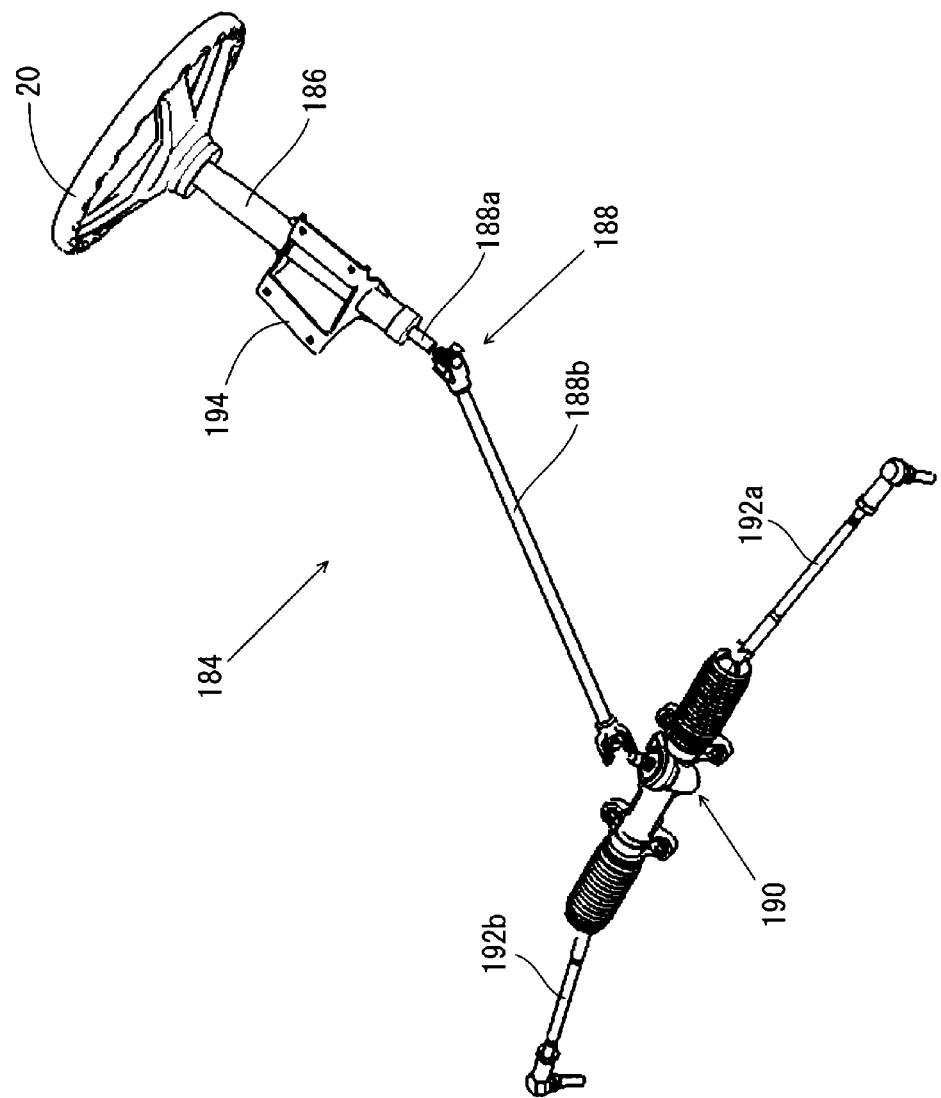
FIG. 15 is a perspective view of the steering wheel and the transfer mechanism.
Figure 16:
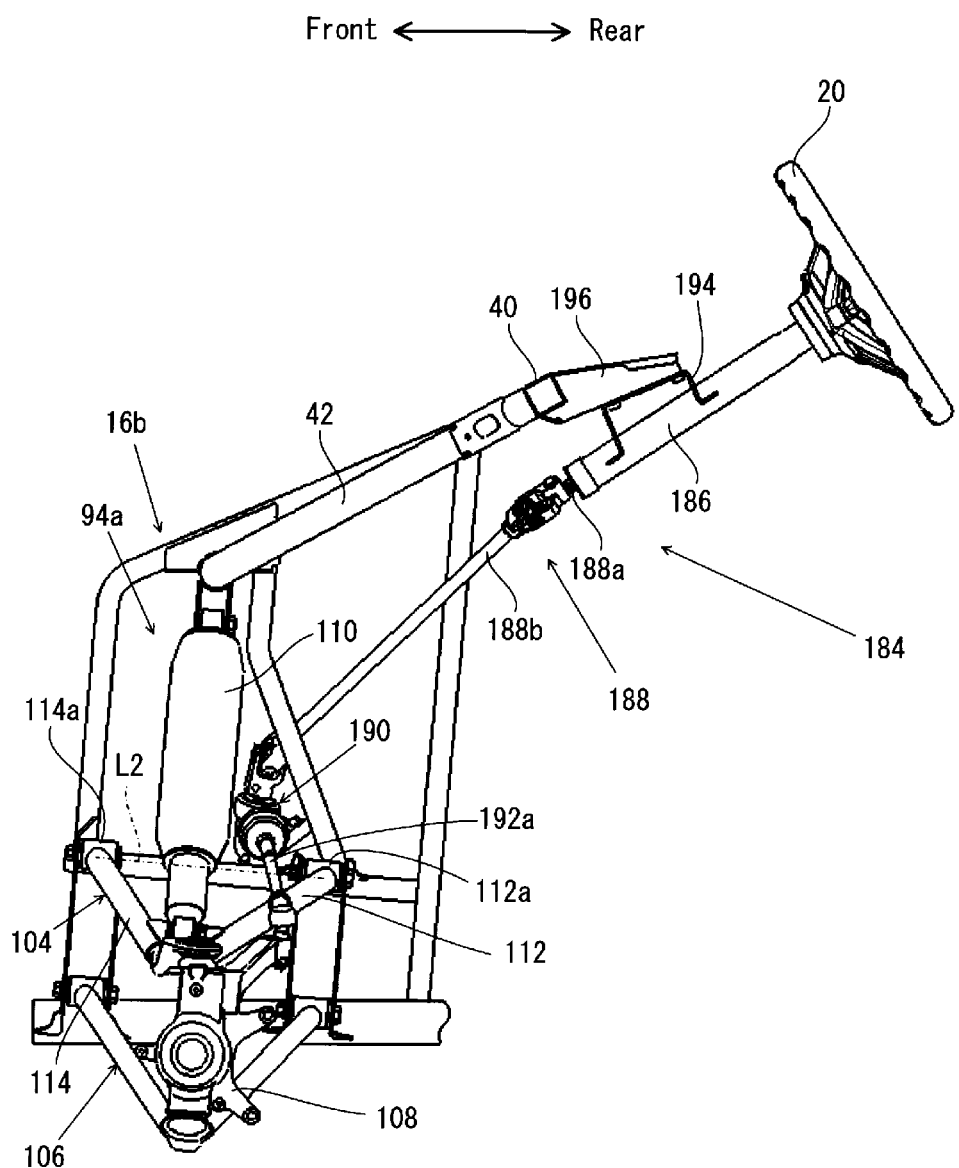
FIG. 16 is a side view showing an arrangement of the transfer mechanism and a surrounding area.

Referring to FIG. 13, the engine 178 as a drive source is supported at a rearward region of the main frame portion 16a. Referring to FIG. 7 and FIG. 13, a majority of the engine 178 is located within a space surrounded by the side frame portions 25a, 25b, the side frame portions 46a, 46b, the support frame portions 48a, 48b, the side frame portions 50a, 50b, and the support frame portions 54a, 54b. In the present preferred embodiment, at least a portion of the engine 178 is at a more rearward position than the roll-over protection cage 22.

Referring to FIG. 13, the propeller shaft 180 extends forward from a lower end region of the engine 178, whereas the propeller shaft 182 extends rearward from a lower end region of the engine 178. In order to avoid complication in the drawing, the propeller shaft 180 and the propeller shaft 182 are illustrated only partially in FIG. 13.

The propeller shaft 180 is connected to the differential device 142 (see FIG. 10), whereas the propeller shaft 182 is connected to the differential device 170 (see FIG. 10).

Referring to FIG. 11 and FIG. 13, rotation from the engine 178 is transmitted by the propeller shaft 180, the differential device 142, the drive shafts 144a, 144b, the constant-velocity joints 146a, 146b, and the axles 148a, 148b, to the pair of front wheels 12. Thus, the pair of front wheels 12 are rotated. Also, referring to FIG. 12 and FIG. 13, rotation from the engine 178 is transmitted by the propeller shaft 182, the differential device 170, the drive shafts 172a, 172b, the constant-velocity joints 174a, 174b, and the axles 176a, 176b, to the pair of rear wheels 14. Thus, the pair of rear wheels 14 are rotated.

Referring to FIG. 14 through FIG. 17, the vehicle 10 further includes a transfer mechanism 184 which transmits movements of the steering wheel 20 to the pair of front wheels 12. The transfer mechanism 184 can be any known rack and pinion type transfer mechanism, for example. Therefore, the transfer mechanism 184 will be described only briefly. The transfer mechanism 184 includes a steering column portion 186, a steering shaft portion 188, a rack-and-pinion portion 190 and a pair of tie rods 192a, 192b.

The steering column portion 186 is hollow, rotatably supporting the steering wheel 20. The steering column portion 186 is supported by a cross member 40 of the frame portion 16 via brackets 194, 196.

The steering shaft portion 188 extends forward from the steering wheel 20, and rotates with the steering wheel 20. The steering shaft portion 188 includes a first shaft 188a and a second shaft 188b. The first shaft 188a is inserted into the steering column portion 186 rotatably. The first shaft 188a has an upper end region (not illustrated) connected to the steering wheel 20. The first shaft 188a has a lower end region connected to an upper end region of the second shaft 188b.

The rack-and-pinion portion 190 is at a tip region of the steering shaft portion 188. Specifically, the second shaft 188b has its lower end region connected to the rack-and-pinion portion 190. Since the rack-and-pinion portion 190 can be any known rack-and-pinion portion, the rack-and-pinion portion 190 will not be described in any more detail.

The tie rods 192a, 192b are at a more forward position than the steering wheel 20. The tie rods 192a, 192b extend in the width direction of the vehicle 10 and connect the rack-and-pinion portion 190 to the knuckle arms 108, 132. In the present preferred embodiment, the tie rods 192a, 192b pass behind the shock absorbers 110, 134 and above the upper arms 104, 128, to connect the rack-and-pinion portion 190 with the knuckle arms 108, 132.

Figure 18:
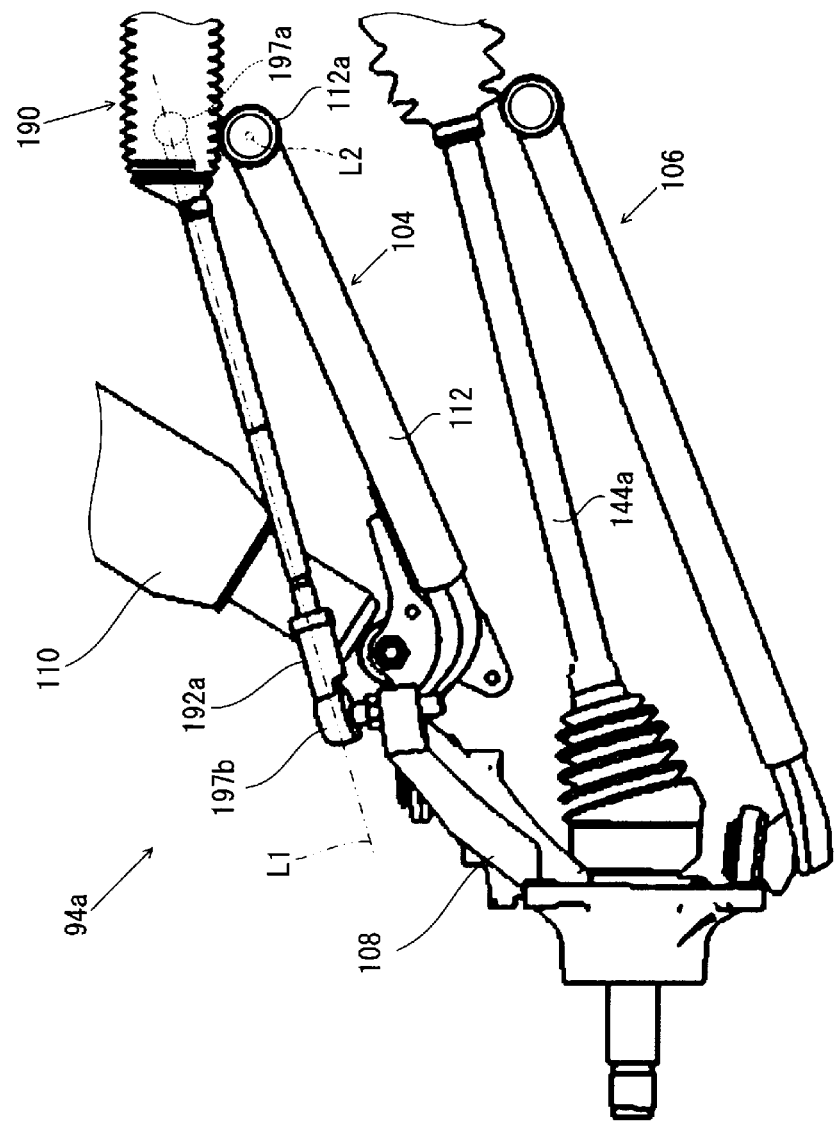
FIG. 18 is a rear view showing the suspension assembly, a drive shaft and a tie rod.

Referring to FIG. 18, the tie rod 192a includes an inner-side end portion 197a which is closer to the rack-and-pinion portion 190, and an outer-side end portion 197b which is closer to the knuckle arm 108. In the present preferred embodiment, the upper arm 104 and the tie rod 192a are disposed so that an imaginary first straight line L1 which passes through the inner-side end portion 197a and the outer-side end portion 197b passes above an imaginary straight line L2 which connects a pivot center of the first end portion 112a and a pivot center of the second end portion 114a (see FIG. 16). The upper arm 128 and the tie rod 192b have the same positional relationship.

Figure 17:
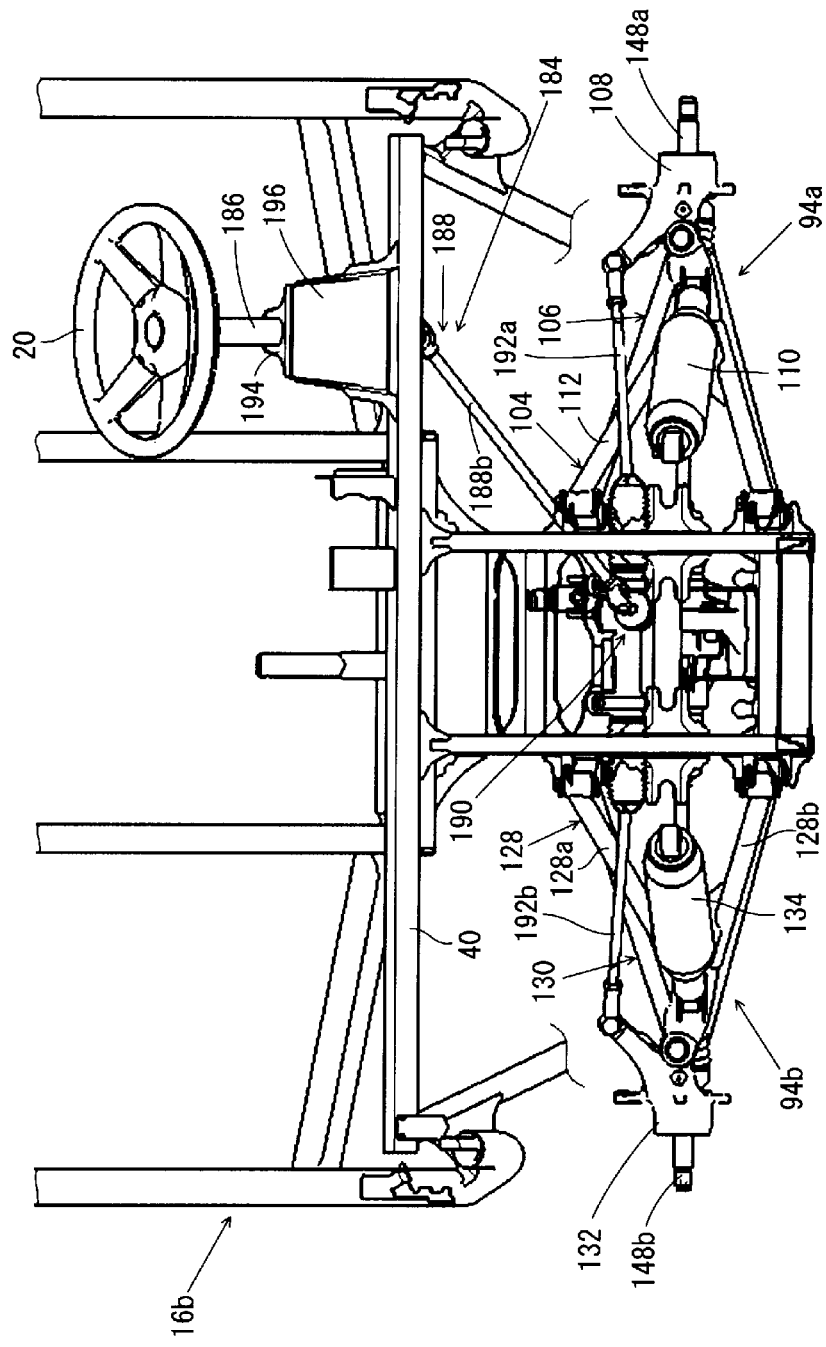
FIG. 17 is a plan view showing the arrangement of the transfer mechanism and a surrounding area.
Figure 19:
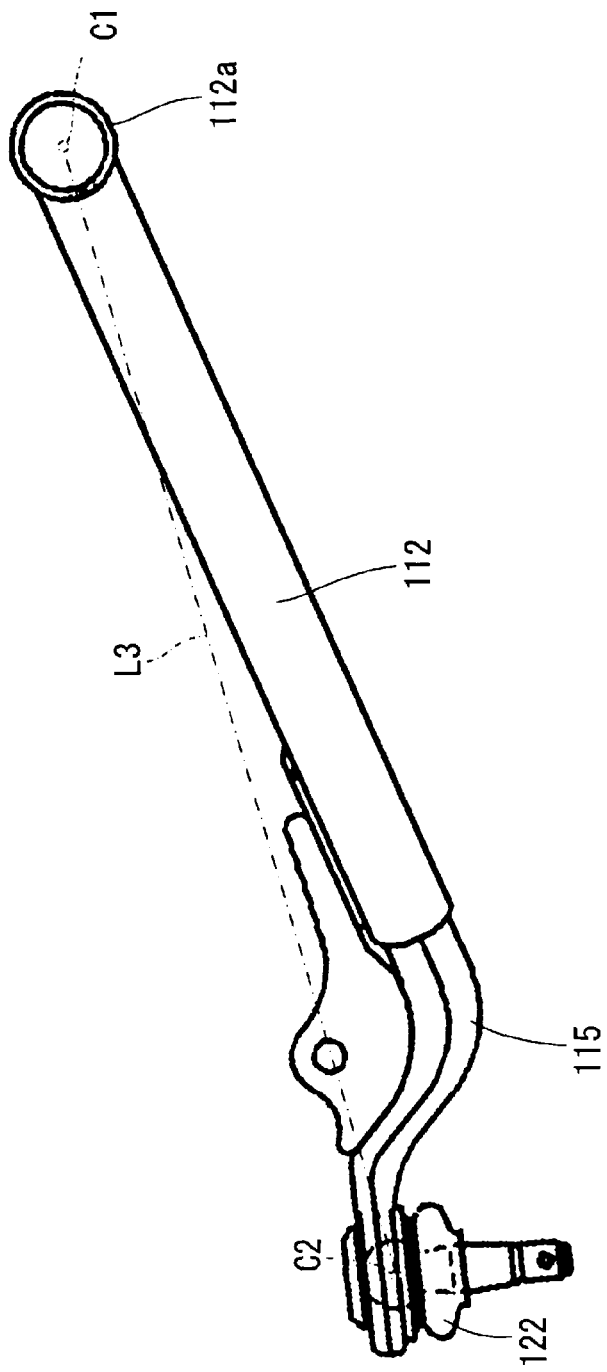
FIG. 19 is a rear view showing a rear arm portion of an upper arm.

Referring to FIG. 17, in a plan view, the rear arm portion 112 of the upper arm 104 overlaps the tie rod 192a, whereas the rear arm portion 128a of the upper arm 128 overlaps the tie rod 192b. In the present preferred embodiment, the rear arm portions 112, 128a have unique shapes in order that the rear arm portions 112, 128a will not make contact with the tie rods 192a, 192b in the arrangement described so far. Specifically, referring to FIG. 19, in a rear view (front view), the rear arm portion 112 extends from the first end portion 112a toward the connecting portion 115, at a greater downward tilt than an imaginary straight line L3 which connects a pivot center C1 of the first end portion 112a and a rotation center C2 of the ball joint 122, and then is connected to the connecting portion 115. The rear arm portion 128a is left-right symmetrical with the rear arm portion 112, so description of the rear arm portion 128a will not be made.

Referring to FIG. 11, in the present preferred embodiment, the front arm portion 114 of the upper arm 104 and the front arm portion 128b of the upper arm 128 also have the same characteristic as the rear arm portions 112, 128a. Specifically, in a front view, the front arm portion 114 extends from the second end portion 114a toward the connecting portion 115, at a greater downward tilt than an imaginary straight line (not illustrated) which connects the pivot center of the second end portion 114a and the rotation center C2 (see FIG. 19) of the ball joint 122, and then is connected to the connecting portion 115. The front arm portion 128b is left-right symmetrical with the front arm portion 114, so description of the front arm portion 128b will not be provided.

Movement of the steering wheel 20 is transmitted through the steering shaft portion 188, the rack-and-pinion portion 190 and the pair of tie rods 192a, 192b, to the knuckle arms 108, 132. Then the knuckle arms 108, 132 pivots in a left-right direction, to steer the pair of front wheels 12.

Referring to FIG. 4, the seat unit 18 includes a plurality (for example, three in the present preferred embodiment) of seat portions 198, 200, 202 arranged side by side in this order in the width direction of the vehicle 10. In the width direction of the vehicle 10, the seat portion 200 is in the middle of the seat unit 18. In other words, the seat portion 200 is adjacent to the seat portion 198 and is adjacent to the seat portion 202 in the width direction of the vehicle 10. When viewed from the seat portion 200, the seat portion 202 is on the side spaced away from the seat portion 198. The steering wheel 20 is in front of the first seat portion 198. Specifically, in the present preferred embodiment, the seat portion 198 is a seat portion for the driver, whereas the seat portions 200, 202 are seat portions for passengers.

The seat portion 198 includes a seat bottom portion 204, a seat back portion 206 and a headrest portion 208. The seat portion 200 includes a seat bottom portion 210, a seat back portion 212 and a headrest portion 214. The seat portion 202 includes a seat bottom portion 216, a seat back portion 218 and a headrest portion 220. The seat back portions 206, 212, 218 tilt rearward. The seat back portion 212 has a greater rearward tilt angle than the seat back portions 206, 218. The headrest portion 214 is at a more rearward position than the headrest portions 208, 220.

Hereinafter, functions and advantages of the vehicle 10 will be described.

In the vehicle 10, the drive shafts 144a, 144b pass through between the upper arms 104, 128 and the lower arms 106, 130, whereas the tie rods 192a, 192b pass through above the upper arms 104, 128. This makes it possible to decrease a distance from the upper arms 104, 128 to the respective lower arms 106, 130 in an up-down direction in comparison to the case where the tie rods 192a, 192b pass through between the upper arms 104, 128 and the lower arms 106, 130. As a result, it is possible to make the suspension assembles 94a, 94b compact.

In a plan view, the rear arm portion 112 overlaps the tie rod 192a which extends in a left-right direction, whereas the rear arm portion 128a overlaps the tie rod 192b which extends in a left-right direction. In other words, the rear arm portions 112, 128a extends from ahead of the tie rods 192a, 192b to behind the tie rods 192a, 192b in the vehicle's fore-aft direction. By arranging the rear arm portions 112, 128a in this way, it becomes possible to increase a fore-aft dimension of the rear arm portions 112, 128a. This makes it possible to increase a fore-aft dimension of the upper arms 104, 128. As a result, the arrangement makes it possible to improve strength and resistance of the upper arms 104, 128 to external forces in the fore-aft direction.

The rear arm portion 112 extends from the first end portion 112a toward the connecting portion 115 at a greater downward tilt than the imaginary straight line L3 which connects the pivot center C1 of the first end portion 112a and the rotation center C2 of the ball joint 122. In this case, it is possible to sufficiently separate the tie rod 192a and the rear arm portion 112 from each other in an up-down direction. The arrangement makes it possible to prevent the tie rod 192a and the rear arm portion 112 from making contact to each other when the upper arm 104 pivots up and down. The same applies to the rear arm portion 128a.

The suspension assembles 94a, 94b include shock absorbers 110, 134 which connect the upper arms 104, 128 to the frame portion 16. In this case, the shock absorbers 110, 134 are not supported by the lower arms 106, 130 but are supported by the upper arms 104, 128, and therefore the arrangement makes it possible to dispose the shock absorbers 110, 134 above the drive shafts 144a, 144b. Contact between the drive shafts 144a, 144b and the shock absorbers 110, 134 is prevented by such a simple arrangement.

The tie rods 192a, 192b are at a more forward position than the steering wheel 20, and pass behind the shock absorbers 110, 134. In this case, the arrangement makes it possible to protect the tie rods 192a, 192b with the shock absorbers 110, 134. Also, the arrangement shortens the distance from the steering wheel 20 to the tie rods 192a, 192b in a fore-aft direction, and this makes it possible to make the transfer mechanism 184 compact.

The imaginary first straight line L1 which passes through the inner-side end portion 197a and the outer-side end portion 197b of the tie rod 192a passes above the imaginary second straight line L2 which connects the pivot center of the first end portion 112a and the pivot center of the second end portion 114a. By disposing the tie rod 192a and the upper arm 104 in this way, it becomes possible to sufficiently separate the tie rod 192a and the upper arm 104 from each other in an up-down direction. The arrangement makes it possible to prevent the tie rod 192a and the upper arm 104 from making contact to each other when the upper arm 104 pivots up and down. It also makes it possible to prevent contact between the tie rod 192a and the upper arm 104 without increasing the size of the knuckle arm 108 as compared to cases where the first straight line L1 passes below the second straight line L2. The same applies to the tie rod 192b, the upper arm 128 and the knuckle arm 132.

In the preferred embodiment described above, description was made for a case where the rear arm portions 112, 128a preferably overlap the tie rods 192a, 192b in a plan view. However, the vehicle may have an arrangement that the front arm portions 114, 128b overlap the tie rods 192a, 192b. In this case again, it becomes possible to increase a fore-aft dimension of the front arm portions 114, 128b, and therefore the arrangement makes it possible to increase the fore-aft dimension of the upper arms 104, 128. As a result, the arrangement makes it possible to improve strength and resistance of the upper arms 104, 128 to an external force in the fore-aft direction. As has been described earlier, the front arm portions 114, 128b also have the same characteristics as the rear arm portion 112 which was described with reference to FIG. 19. Therefore, it is possible to sufficiently separate the tie rods 192a, 192b and the front arm portions 114, 128b from each other in an up-down direction even in a case where the vehicle is arranged in such a fashion that the front arm portions 114, 128b overlap the tie rods 192a, 192b in a plan view. Thus, the arrangement makes it possible to prevent the tie rods 192a, 192b and the front arm portions 114, 128b from making contact to each other when the upper arms 104, 128 pivot up and down.

It should be noted here that even in cases where the front arm portion 114 overlaps the tie rod 192a in a plan view, the tie rod 192a and the upper arm 104 should preferably be arranged so that the imaginary straight line L1 passes above the imaginary straight line L2 as was described with reference to FIG. 18. In this case, it is possible to sufficiently separate the tie rod 192a and the upper arm 104 from each other in an up-down direction. Thus, the arrangement makes it possible to prevent the tie rod 192a and the upper arm 104 from making contact to each other when the upper arm 104 pivots up and down. It also makes it possible to prevent contact between the tie rod 192a and the upper arm 104 without increasing the size of the knuckle arm as compared to cases where the first straight line L1 passes below the second straight line L2. The same applies to the upper arm 192b and the upper arm 128.

In the preferred embodiment described above, description was made for a case where the vehicle 10 preferably includes a pair of rear wheels 14. However, the vehicle may include two or more pairs of rear wheels, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a pair of front wheels;
a frame portion;
a drive source;
a pair of suspension assemblies provided at a forward region of the frame portion and suspending the pair of front wheels;
a pair of drive shafts extending in a width direction of the vehicle and transferring driving force from the drive source to the pair of front wheels;
a steering wheel; and
a transfer mechanism transferring movement of the steering wheel to the pair of front wheels; wherein
each of the pair of suspension assemblies includes an upper arm pivotably supported by the frame portion, a lower arm pivotably supported by the frame portion below the upper arm, and a knuckle arm connecting the upper arm and the lower arm to each other;
the transfer mechanism includes a steering shaft portion extending from the steering wheel and rotating with the steering wheel, a rack-and-pinion portion at a tip region of the steering shaft portion, and a pair of tie rods extending in the width direction of the vehicle and connecting the rack-and-pinion portion to the pair of knuckle arms;
each of the pair of drive shafts passes between a corresponding one of the upper arms and a corresponding one of the lower arms;
each of the pair of tie rods passes above a corresponding one of the upper arms;

each upper arm includes a rear arm portion including a first end portion supported by the frame portion pivotably in an up-down direction, a front arm portion including a second end portion supported by the frame portion pivotably in an up-down direction and is at a more forward position than the rear arm portion, and a connecting portion connecting the rear arm portion and the front arm portion to each other on a side away from the first end portion and the second end portion in the width direction of the vehicle;

each tie rod includes an inner-side end portion which is closer to the rack-and-pinion portion, and an outer-side end portion which is closer to the knuckle arm;

the connecting portion is connected to the knuckle arm;

an imaginary first straight line connecting the inner-side end portion and the outer-side end portion passes above an imaginary second straight line connecting a pivot center of the first end portion and a pivot center of the second end portion;

the rack-and-pinion portion is located between the first end portion and the second end portion in a side view of the vehicle and at a higher position than the imaginary second straight line in a rear view of the vehicle; and the outer-side end portion of each of the tie rods is located at a lower position than the imaginary second straight line in the rear view of the vehicle.

2. The vehicle according to claim 1, wherein the outer-side end portion of each of the tie rods is located between the first end portion and the second end portion in a side view of the vehicle.

3. The vehicle according to claim 1, wherein
each of the pair of suspension assemblies includes a ball joint connecting the connecting portion and the knuckle arm to each other; and
each front arm portion extends from the second end portion toward the connecting portion at a greater downward tilt than an imaginary straight line connecting a pivot center of the second end portion and a rotation center of the ball joint in a front view, and then extends upward, toward the connecting portion.

4. The vehicle according to claim 1, wherein each of the pair of suspension assemblies includes a shock absorber connecting the upper arm and the frame portion to each other.

5. The vehicle according to claim 4, wherein each tie rod is at a more forward position than the steering wheel and passes behind the shock absorber.

6. The vehicle according to claim 1, wherein each of the pair of suspension assemblies includes a shock absorber connected to the connecting portion.

* * * * *